United States Patent
Ignatyev et al.

(10) Patent No.: US 11,294,546 B2
(45) Date of Patent: Apr. 5, 2022

(54) AUTOMATED PROCESS DISCOVERY AND FACILITATION WITHIN A CLOUD BUSINESS APPLICATION

(71) Applicant: ORACLE INTERNATIONAL CORPORATION, Redwood Shores, CA (US)

(72) Inventors: Oleksiy Ignatyev, Belmont, CA (US); Gary Alan Wiessinger, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/148,995

(22) Filed: Jan. 14, 2021

(65) Prior Publication Data

US 2021/0132759 A1    May 6, 2021

Related U.S. Application Data

(63) Continuation of application No. 16/413,912, filed on May 16, 2019, now Pat. No. 10,908,788.

(51) Int. Cl.
*G06F 3/0484* (2013.01)
*G06F 16/22* (2019.01)
(Continued)

(52) U.S. Cl.
CPC ............ *G06F 3/0484* (2013.01); *G06F 9/451* (2018.02); *G06F 16/2228* (2019.01); *G06F 40/205* (2020.01)

(58) Field of Classification Search
CPC ....... G06F 3/0484; G06F 40/205; G06F 9/451
See application file for complete search history.

(56) References Cited

U.S. PATENT DOCUMENTS 9,619,775 B1    4/2017  Saito
10,726,095 B1 *  7/2020  Pallemulle .......... G06F 16/9535
(Continued)

FOREIGN PATENT DOCUMENTS

WO    2001075746 A2    4/2000

OTHER PUBLICATIONS

Sage Business Vision; Tips and Tricks: How to Use Auto Generate Purchase Order, 6 pgs, downloaded on May 15, 2018 from: https://sagecity.na.sage.com/support_communities/sage_businessvision/b/sage_businessvision_blog/posts/tips-and-tricks-how-to-use-auto-generate-purchase-order.
(Continued)

*Primary Examiner* — Asher D Kells
(74) *Attorney, Agent, or Firm* — Kraguljac Law Group, LLC

(57) ABSTRACT

Systems, methods, and other embodiments associated with providing automated discovery and facilitation of user business processes are described. Parse a system log of an integrated business system to identify interactions of a user with each event of a selected type of event. For each event, create a data structure that describes the interactions with the event based on the identified interactions and one or more characteristics of the event. Analyze the data structures to train a machine learning model to apply a process applied to events of the selected type by the user. Generate a customized user interface that is configured to present the user with an option to automatically carry out the process for a set of subsequent events of the selected type based on application of the model. Substitute the customized user interface for a standard user interface when transmitting instructions to display one or more subsequent events.

20 Claims, 10 Drawing Sheets

(51) Int. Cl.
G06F 9/451 (2018.01)
G06F 40/205 (2020.01)

(56) References Cited

U.S. PATENT DOCUMENTS

| | | | |
|---|---|---|---|
| 2006/0149639 | A1 | 7/2006 | Liu et al. |
| 2009/0006108 | A1* | 1/2009 | Bodin .................... G06Q 10/06 705/300 |
| 2010/0146110 | A1* | 6/2010 | Christensen ........... G06Q 30/02 709/224 |
| 2011/0113287 | A1* | 5/2011 | Gururaj ............... G06F 11/3684 714/37 |
| 2011/0271219 | A1* | 11/2011 | Krishnan ............... G16H 40/40 715/771 |
| 2012/0109772 | A1 | 5/2012 | Chernenko et al. |
| 2012/0226573 | A1 | 9/2012 | Zakas et al. |
| 2014/0372344 | A1* | 12/2014 | Morris .................... G06N 5/02 706/11 |
| 2015/0186806 | A1 | 7/2015 | Hiltz-Laforge et al. |
| 2017/0236131 | A1 | 8/2017 | Nathenson et al. |
| 2019/0018661 | A1* | 1/2019 | Srinivasan Natesan ..................... G06N 20/00 |
| 2020/0020420 | A1 | 1/2020 | Cai et al. |
| 2020/0084487 | A1 | 3/2020 | Chan et al. |

OTHER PUBLICATIONS

Shipwire, Inc.; Powerful Fulfillment Technology to Connect Supply to Demand, Globally, 3 pgs, downloaded on May 14, 2018 from: https://www.shipwire.com/platform/overview/.

* cited by examiner

600 ⟶

∷ Integrated Business System  👤▼ John Smith  Company Corp. - Finance

◉ ◀ ♦ | Finance | Orders | Billing | Calendar | Payroll | Reports

Orders Pending Approval   List   Search
VIEW [Default ▼]  [Customize View]  [Add New Order]
▶ FILTERS                                                                                         ⟵ 655

| EDIT\|VIEW | ID NO. | DATE & TIME | NAME | AMOUNT | PAY TYPE |
|---|---|---|---|---|---|
| Edit\|View | 7098 | 6/6/2019 2:35PM | Good Customer Co. | $12,500 | Check |
| Edit\|View | 7097 | 6/6/2019 1:46AM | Suspicious Inc. | $1,000 | PayPal |
| Edit\|View | 7096 | 6/5/2019 9:22PM | Big Buyer Inc. | $252,750 | Net 90 |
| Edit\|View | 7095 | 6/5/2019 10:07AM | Regular Purchaser, LLC | $2,000 | EOM |
| Edit\|View | 7094 | 6/5/2019 10:02AM | New Customer Corp. | $12,500 | Credit Card |
| Edit\|View | 7093 | 6/4/2019 4:43PM | Regular Purchaser, LLC | $2,050 | EOM |
| Edit\|View | 7092 | 6/3/2019 12:17PM | Regular Purchaser, LLC | $44,675 | EOM |
| Edit\|View | 7091 | 5/31/2019 8:52PM | Other New Cust. Co. | $8,000 | Check |
| Edit\|View | 7090 | 5/31/2019 4:00PM | Regular Purchaser, LLC | $1,825 | EOM |
| Edit\|View | 7089 | 5/31/2019 11:21AM | Good Customer Co. | $9,500 | Check |

∷ Integrated Business System  👤▼ John Smith  Company Corp. - Finance

◉ ◀ ♦ | Finance | Orders | Billing | Calendar | Payroll | Reports

Orders Pending Approval   List   Search
VIEW [Default ▼]  [Customize View]  [Add New Order]
▶ FILTERS

| EDIT\|VIEW | ID NO. | DATE & TIME | NAME | AMOUNT | PAY TYPE |
|---|---|---|---|---|---|
| Edit\|View ▼ | 7078 | 4/28/2019 3:09PM | Good Customer Co. | $5,540 | Check |
| Edit\|View ⇅ | 7089 | 5/31/2019 11:21AM | Good Customer Co. | $9,500 | Check |
| Edit\|View ⇅ | 7098 | 6/6/2019 2:35PM | Good Customer Co. | $12,500 | Check |
| Edit\|View ⇅ | 7090 | 5/31/2019 4:00PM | Regular Purchaser, LLC | $1,825 | EOM |
| Edit\|View ⇅ | 7092 | 6/3/2019 12:17PM | Regular Purchaser, LLC | $44,675 | EOM |
| Edit\|View ⇅ | 7093 | 6/4/2019 4:43PM | Regular Purchaser, LLC | $2,050 | EOM |
| Edit\|View ⇅ | 7095 | 6/5/2019 10:07AM | Regular Purchaser, LLC | $2,000 | EOM |
| Edit\|View ⇅ | 7096 | 6/5/2019 9:22PM | Big Buyer Inc. | $252,750 | Net 90 |
| Edit\|View ⇅ | 7094 | 6/5/2019 10:02AM | New Customer Corp. | $12,500 | Credit Card |
| Edit\|View ▲ | 7091 | 5/31/2019 8:52PM | Other New Cust. Co. | $8,000 | Check |

| ⁘ Integrated Business System | | | | 👥▼ John Smith<br>Company Corp. - Finance | |
|---|---|---|---|---|---|
| ◉ ◀ ◆ Finance | Orders | Billing | Calendar | Payroll | Reports |

Orders Pending Approval  — 825   List   Search

VIEW [Default ▼]  [Customize View]  [Add New Order]  [Action 1]

▶ FILTERS

| EDIT\|VIEW | ID NO. | DATE & TIME | NAME | AMOUNT | PAY TYPE |
|---|---|---|---|---|---|
| Edit\|View | 7098 | 6/6/2019 2:35PM | Good Customer Co. | $12,500 | Check |
| Edit\|View | 7097 | 6/6/2019 1:46AM | Suspicious Inc. | $1,000 | PayPal |
| Edit\|View | 7096 | 6/5/2019 9:22PM | Big Buyer Inc. | $252,750 | Net 90 |
| Edit\|View | 7095 | 6/5/2019 10:07AM | Regular Purchaser, LLC | $2,000 | EOM |
| Edit\|View | 7094 | 6/5/2019 10:02AM | New Customer Corp. | $12,500 | Credit Card |
| Edit\|View | 7093 | 6/4/2019 4:43PM | Regular Purchaser, LLC | $2,050 | EOM |
| Edit\|View | 7092 | 6/3/2019 12:17PM | Regular Purchaser, LLC | $44,675 | Credit |
| Edit\|View | 7091 | 5/31/2019 8:52PM | Other New Cust. Co. | $8,000 | Check |
| Edit\|View | 7090 | 5/31/2019 4:00PM | Regular Purchaser, LLC | $1,825 | EOM |
| Edit\|View | 7089 | 5/31/2019 11:21AM | Good Customer Co. | $9,500 | Check |

| ⁘ Integrated Business System | | | | 👥▼ John Smith<br>Company Corp. - Finance | |
|---|---|---|---|---|---|
| ◉ ◀ ◆ Finance | Orders | Billing | Calendar | Payroll | Reports |

Orders Pending Approval  — 825   List   Search — 855

VIEW [Default ▼]  [Customize View]  [Add New Order]  [Action 1]  [Action 2]

▶ FILTERS

| EDIT\|VIEW | ID NO. | DATE & TIME | NAME | AMOUNT | PAY TYPE |
|---|---|---|---|---|---|
| Edit\|View | 7078 | 4/28/2019 3:09PM | Good Customer Co. | $5,540 | Check |
| Edit\|View | 7089 | 5/31/2019 11:21AM | Good Customer Co. | $9,500 | Check |
| Edit\|View | 7098 | 6/6/2019 2:35PM | Good Customer Co. | $12,500 | Check |
| Edit\|View | 7090 | 5/31/2019 4:00PM | Regular Purchaser, LLC | $1,825 | EOM |
| Edit\|View | 7092 | 6/3/2019 12:17PM | Regular Purchaser, LLC | $1,675 | Credit |
| Edit\|View | 7093 | 6/4/2019 4:43PM | Regular Purchaser, LLC | $2,050 | EOM |
| Edit\|View | 7095 | 6/5/2019 10:07AM | Regular Purchaser, LLC | $2,000 | EOM |
| Edit\|View | 7096 | 6/5/2019 9:22PM | Big Buyer Inc. | $252,750 | Net 90 |
| Edit\|View | 7097 | 6/6/2019 1:46AM | Suspicious Inc. | $1,000 | PayPal |
| Edit\|View | 7082 | 5/29/2019 12:15AM | Fraud Co. | $12,500 | PayPal |

AUTOMATED PROCESS DISCOVERY AND FACILITATION WITHIN A CLOUD BUSINESS APPLICATION

CROSS REFERENCE TO RELATED APPLICATION

This disclosure is a continuation of and claims the benefit of priority to U.S. patent application Ser. No. 16/413,912 (U.S. Pat. No. 10,908,788), entitled "Automated Process Discovery and Facilitation Within a Cloud Business Application," filed May 16, 2019, which is incorporated herein by reference in its entirety for all purposes.

BACKGROUND

When a user accesses a cloud business application, they are initially presented with a default user interface. The default user interface may be standard for, for example, all users, all users of the same type as the user, and/or all users associated with a business. The user may use this default user interface to perform one or more processes using the business application. This process may be based on business logic unique to the user or to the user's associated business, and the default user interface is not specifically designed to facilitate the process.

For example, when the business receives a purchase order within the cloud business application from its customer, the user may need to perform several discrete interactions with the default user interface in order to cause a product to be delivered to the customer who placed the purchase order. Depending on the volume of purchase orders received by the business, these interactions may be repeated many times per day. But, each purchase order may be subject to different processing based on any number of characteristics associated with the order. This business logic describing the different processing is known to the user, but is not specifically accommodated by the default user interface.

Thus, using the default user interface, the user may be required to perform repetitive manual interactions with the default user interface in order to complete the process dictated by the business logic. This repetition can be time consuming, especially when the user may need to repeat the process multiple times per day. This places a burden on each of (i) the user, who must take the time to repeatedly performs the interactions, (ii) the business, which must dedicate time and computing resources to the completion of the process, and (iii) the operator of the cloud business application who must dedicate computing resources to continuously providing the cloud business application to the user while the user repeatedly performs the interactions.

In some situations, the user may be able to customize their user interface to facilitate the process, reducing the number of manual steps required. But, this customization requires that the user, or the business, take affirmative steps to design a customized user interface. Users and businesses that are already burdened by the manual performance of the repeated actions are unlikely to dedicate further time to customize the user interface, leaving the problem of wasteful repetition unresolved. Further, each individual user of a cloud business application may have different tastes and preferences of how the features of the customized user interface are configured.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 6A illustrates an example standard user interface.

FIG. 6B illustrates an example customized user interface customized in accordance with the method presented with reference to FIG. 5.

FIG. 8A illustrates an example customized user interface customized in accordance with the method presented with reference to FIG. 7.

FIG. 8B illustrates an example customized user interface customized with multiple customizations.

DETAILED DESCRIPTION

Figure 1:
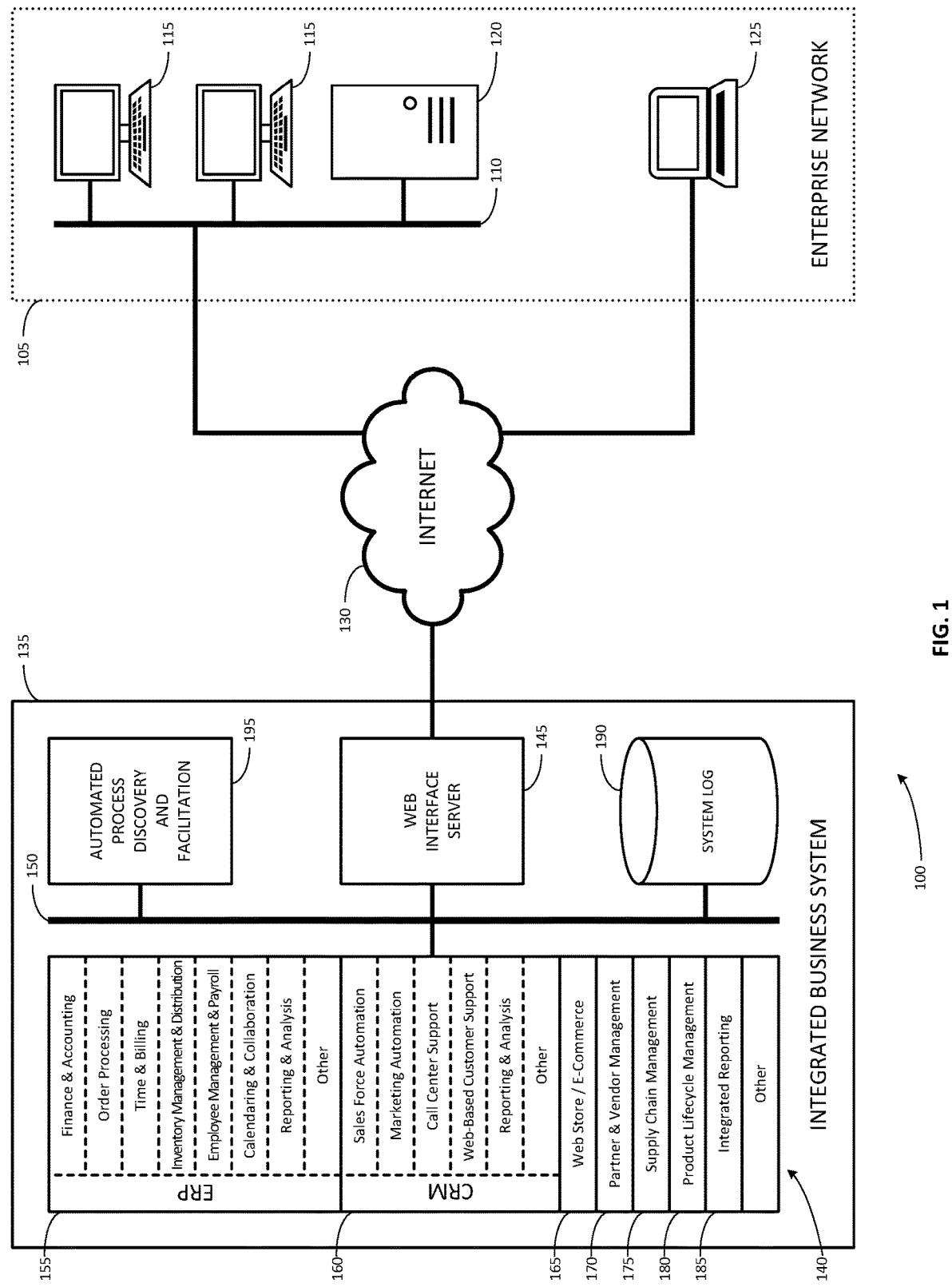
FIG. 1 illustrates one embodiment of a multi-tenant system including automated process discovery and facilitation.

Systems and methods are described herein that provide automated process discovery and facilitation within a cloud business application. Machine learning is applied to analyze historical data about interactions of users with the cloud business application in order to discover a process or business logic guiding the user interactions. Then, a customized user interface that facilitates the discovered process or business logic may be automatically generated and substituted for the default user interface. Thus, a distinct customized user interface can be automatically generated for each user of the cloud business application.

I. Example Implementation Environment

An example of one possible use case or implementation environment for an embodiment of the inventive system and methods is that of a multi-tenant system or data processing platform. This setting provides a useful example, as such platforms store and process relatively large amounts of data for operating companies who are tenants of the platform. Users (either tenant employees or customers) may frequently desire to access content provided on one or more web pages provided by (or for) a tenant operating an eCommerce website or other form for delivering information to users. In such an environment, one or more business related applications (e.g., ERP, CRM, HR, eCommerce, financial) may be used by a customer or tenant employee to perform a search or to generate a report that accesses data stored in a database associated with that tenant.

A multi-tenant architecture provides a means for multiple accounts (tenants) and users to store and access their data, and to utilize specific applications that reside on a remote platform. The platform is typically implemented as a set of servers or server groups, and is administered and operated by another party that provides use of the platform infrastructure as a service to the accounts and each account's users. This service may provide data storage, computational processing power, data analytics, and applications or workflows that may be executed with reference to an account's data (in whole or in part, and account-wide or user-specific). In some cases, such services have been described as Software-as-a-Service (SaaS), cloud-based services, web-services, or remote services.

The applications that reside on a platform may be used to process certain of a user's data by instantiating an occurrence of the application within the user's account; for these types of uses, the applications may include ones utilized to operate a business, such as ERP, CRM, eCommerce, and financial applications. Tenant customizations to the operation of the architecture may include custom functionality (such as the capability to perform tenant or user-specific functions, workflows, data processing, or operations) built on top of lower level operating system functions.

Some multi-tenant service platforms may offer the ability to customize functions or operations at several different levels of the service platform, from aesthetic modifications to a graphical user interface to providing integration of components and/or entire applications developed by independent third-party vendors. By permitting use of components and/or applications developed by third party vendors, a multi-tenant service can significantly enhance the functionality available to tenants and increase tenant satisfaction with the platform.

FIG. 1 illustrates one embodiment of a multi-tenant system including automated process discovery and facilitation. Enterprise network 105 may be associated with a business, such as a retailer, merchant, service provider, or other type of business. Alternatively, and in accordance with the advantages of an application service provider (ASP) hosted integrated business system (such as a multi-tenant data processing platform), the business may comprise fewer or no dedicated facilities or business network at all, provided that its end users have access to an internet browser and an internet connection. For simplicity and clarity of explanation, the enterprise network 105 is represented by an on-site local area network 110 to which one or more personal computers 115, or servers 120 are operably connected, along with one or more remote user computers 125 that are connected to the enterprise network 105 through the Internet 130 or other suitable communications network or combination of networks. Each personal computer 115 is generally dedicated to a particular end user, such as a service agent or other employee associated with the business, although such dedication is not required. The remote user computers 125 may similarly be dedicated to a particular end user associated with the business. The personal computers 115 and remote user computers 125 can be, for example, a desktop computer, laptop computer, tablet computer, smartphone, or other device having the ability to connect to local area network 110 or Internet 130 or having other synchronization capabilities. Users of the enterprise network 105 interface with integrated business system 135 across the Internet 130 or another suitable communications network or combination of networks.

Integrated business system 135, which may be hosted by a dedicated third party, may include an integrated business server 140 and a web interface server 145, operably connected by a network 150. In some embodiments, either or both of the integrated business server 140 and the web interface server 145 may be implemented on one or more different hardware systems and components, even though represented as single units in FIG. 1.

One example of an integrated business system 135 is the Oracle® NETSUITE® cloud business management software suite. NETSUITE® and other integrated business systems (such as Intacct, SAP, Sage, Microsoft® Dynamics) may be improved by incorporating the claimed systems and methods.

In one example configuration, integrated business system 135 is operated by a third party for the benefit of multiple account owners/tenants, each of whom is operating a business, and each of whom has an associated enterprise network 105.

In one example configuration, integrated business server 140 includes various modules, which may include, for example any one or more of an enterprise resource planning (ERP) module 155, a customer relationship management (CRM) module 160, a web store/e-commerce module 165, a partner and vendor management module 170, a supply chain management (SCM) module 175, a product lifecycle management (PLM) module 180, and an integrated reporting module 185. The ERP module 155 may include, but is not limited to, a finance and accounting module, an order processing module, a time and billing module, an inventory management and distribution module, an employee management and payroll module, a calendaring and collaboration module, a reporting and analysis module, and other ERP-related modules (such as retail point of sale (POS), product information management (PIM), demand/material requirements planning (MRP), and purchasing modules). The CRM module 160 may include, but is not limited to, a sales force automation (SFA) module, a marketing automation module, a contact list module (not shown), a call center support module, a web-based customer support module, a reporting and analysis module, and other CRM-related modules (such as contact list, returns management authorization (RMA), and loyalty program support modules). Other modules may also be included, for example, content management system (CMS) and human resources management modules. Further, integrated business server 140 may further include user administration modules for governing the access of tenants and users to the integrated business system 135.

In many cases, it will be desirable for the one of the above modules 155-185 to share methods, libraries, databases, subroutines, variables, etc., with one or more other of the above modules 155-185. For example, ERP module 155 may be intertwined with CRM module 160 into an integrated Business Data Processing Platform (which may be single tenant or multi-tenant).

Web interface server 145 is configured and adapted to interface with the integrated business server 140 to provide one or more web-based user interfaces to end users of the enterprise network 105.

System Log 190 is configured and adapted to interface with the integrated business server 140 and web interface server 145 to record every event that occurs within the integrated business system 135. Each event is recorded in the system log 190 with (i) the information necessary to identify the event along with (ii) a timestamp indicating when the event occurred. For example, the arrival of a purchase order in the integrated business system 135 will be recorded as an entry in the system log 190, with information pointing to the purchase order's location in storage alongside a timestamp indicating when the purchase order arrived. In another example, a user logging into the integrated business system 135 will also be recorded in the system log 190, alongside a timestamp indicating when the login occurred. In another example, the selection by the user of the purchase order for viewing will be recorded in the system log 190, alongside a timestamp indicating when the selection for viewing occurred. Generally, the system log 190 is included in the integrated business system 135 for debugging purposes. For example, if users are experiencing problems with the software, engineers may then review the system log 190 to help determine the cause of the problem.

In one embodiment, an automated process discovery and facilitation server 195 may be included in the integrated business system 135. The automated process discovery and facilitation server is configured and adapted to interface with the integrated business server 140, web interface server 145, and system log 190. The automated process discovery and facilitation server 195 may act to discover user business processes from user interactions with the integrated business system 135 and generate customized user interface is to facilitate these processes, as described further herein.

The integrated business system 135 shown in FIG. 1 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server may be a combination of hardware and the software that delivers content, commonly by hosting a website, to client web browsers that access the web server via the Internet. In one example, web interface server 145 includes a web server.

Figure 2:
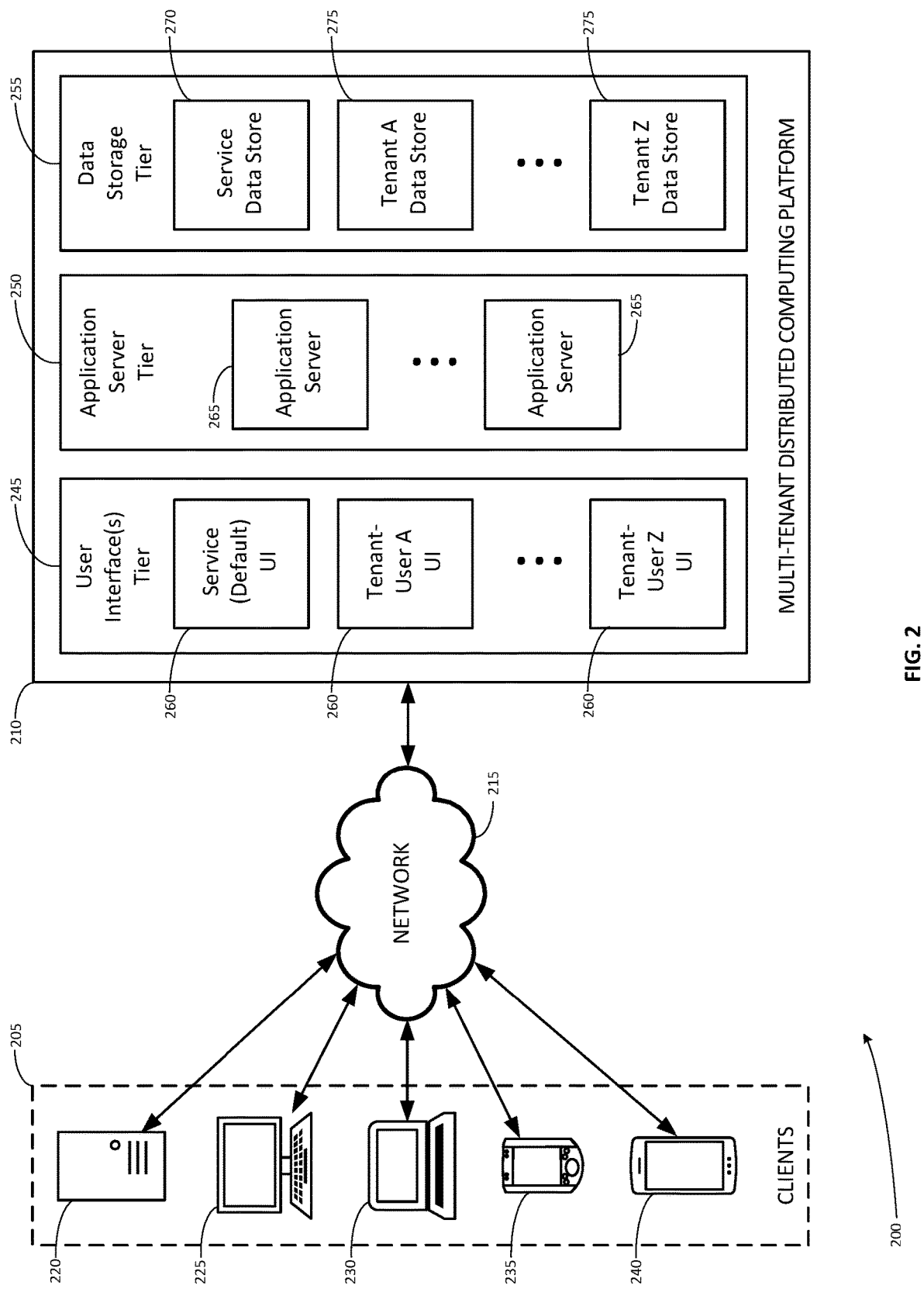
FIG. 2 illustrates elements or components of an example operating environment in which an embodiment of the invention may be implemented.

FIG. 2 is a diagram illustrating elements or components of an example operating environment 200 in which an embodiment of the invention may be implemented. The software architecture depicted in FIG. 2 represents a simplified example of a complex software system to which an embodiment of the invention may be applied.

As shown, a variety of clients 205 incorporating and/or incorporated into a variety of computing devices may communicate with a distributed computing service/platform 210 through one or more networks 215. For example, a client may incorporate and/or be incorporated into a client application implemented by one or more of the computing devices. Examples of suitable clients include web browsers and dedicated client software applications. Examples of suitable computing devices include server computers 220, personal computers such as desktop computers 225 and laptop or notebook computers 230, tablet computers or personal digital assistants (PDAs) 235, cell phones or smart phones 240, and other electronic devices incorporating one or more computing device components, such as one or more electronic processors, microprocessors, central processing units (CPU), or controllers. Examples of suitable networks 215 include networks utilizing wired and/or wireless communication technologies and networks operating in accordance with any suitable networking and/or communication protocol (e.g., the Internet).

In one embodiment, distributed computing service/platform 210 may be a multi-tenant business data processing platform. In this configuration, service platform 210 may be operated by an entity in order to provide multiple tenants with a set of business-related applications, data storage, and functionality. These applications and functionality may include ones that a business uses to manage various aspects of its operations. For example, the applications and functionality may include providing web-based access to business information systems, thereby allowing a user with a browser and an Internet or other network 215 connection to view, enter, process, or modify certain types of business information.

The distributed computing service/platform 210 may include multiple processing tiers, including a user interface tier 245, an application server tier 250, and a data storage tier 255. Each processing tier shown in the figure may be implemented with a set of computers and/or computer components including a processor accessing memory, and may perform various functions, methods, processes, or operations as determined by the execution of a software application or set of instructions.

The user interface tier 245 may maintain multiple user interfaces 260, including graphical user interfaces and/or web-based interfaces. The user interfaces may include a default user interface for the service to provide access to applications and data for a user or "tenant" of the service (depicted as "Service (Default) UI" in the figure), as well as one or more user interfaces that have been specialized/customized in accordance with user specific requirements (represented by "Tenant-User A UI" . . . "Tenant-User Z UI" in the figure, and which may be accessed via one or more APIs). The default user interface may include components enabling a tenant to administer the tenant's participation in the functions and capabilities provided by the service platform, such as accessing data, causing the execution of specific data processing operations, etc., although not all users will necessarily have permission to view these components.

The application server tier 250 provides the framework of software to implement the functions or business applications of integrated business server 140. Such functions or business applications are typically implemented by one or more modules of software code/instructions that are maintained on and executed by one or more application servers 265 that are part of the platform's application server tier 250.

The data storage tier 255 may include one or more data stores, which may include a Service Data store 270 and one or more Tenant Data stores 275 (represented by "Tenant A Datastore" . . . "Tenant Z Datastore" in the figure). Each tenant data store 275 may contain tenant-specific data that is used as part of providing a range of tenant-specific business services or functions, including but not limited to the to the functions or business applications of integrated business server 140, such as ERP, CRM, etc. Data stores may be implemented with any suitable data storage technology, including structured query language (SQL) based relational database management systems (RDBMS).

Figure 3C:
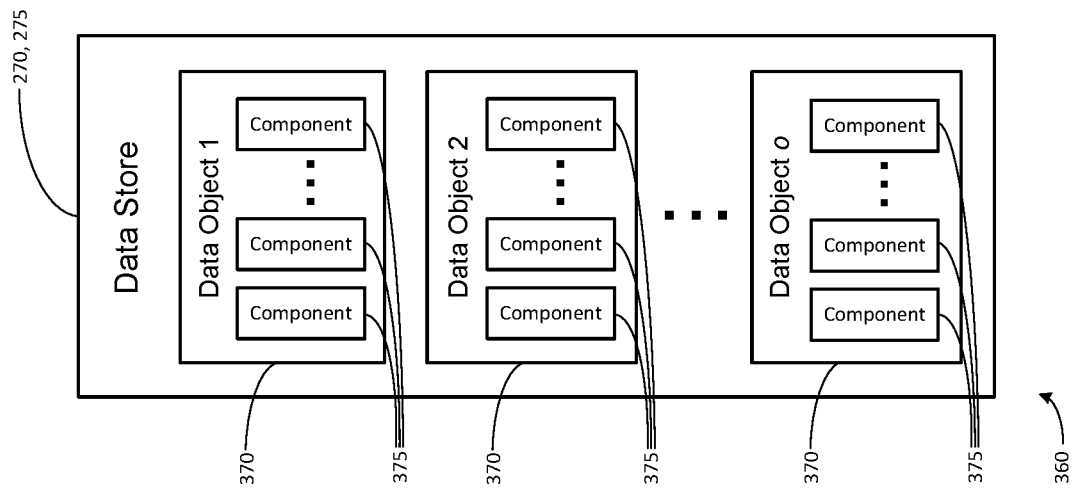
FIG. 3C illustrates additional details of the elements or components of a data store.
Figure 3B:
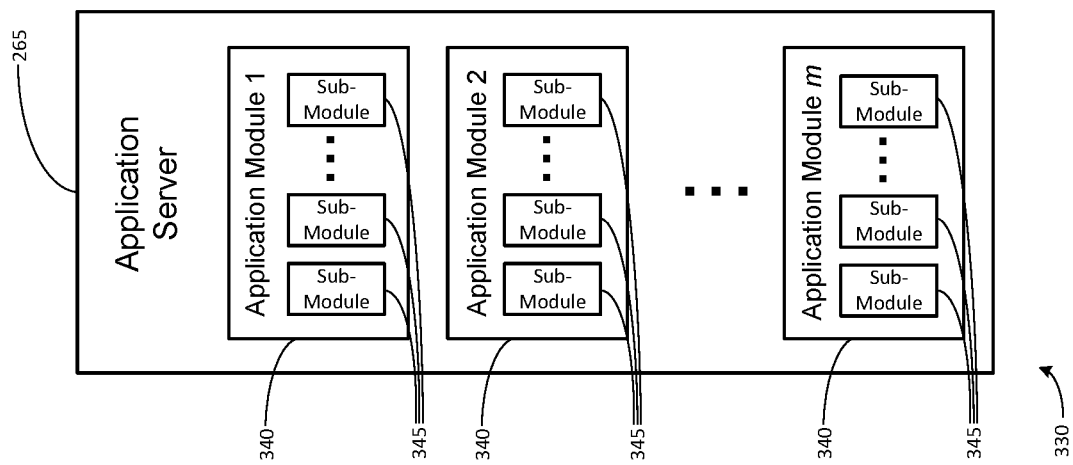
FIG. 3B illustrates additional details of the elements or components of an application server.
Figure 3A:
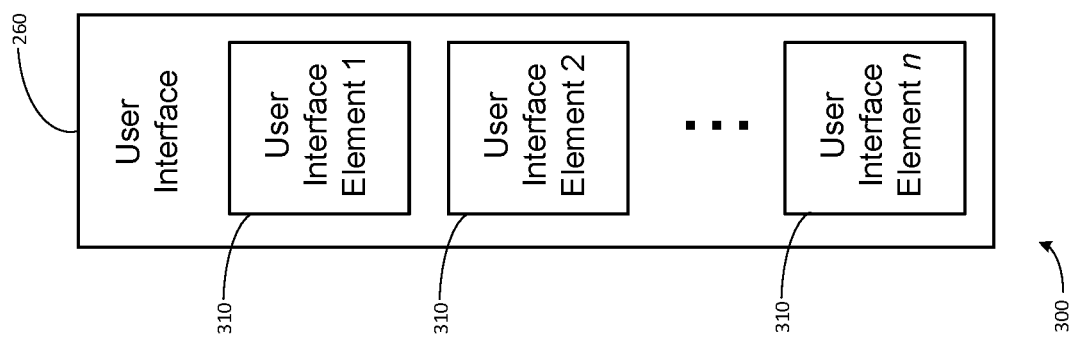
FIG. 3A illustrates additional details of the elements or components of a user interface.

FIG. 3A is a diagram illustrating additional details of the elements or components of the user interface 260 first presented with reference to FIG. 2. Examples of user interfaces 260 include graphical user interfaces (GUIs) and application programming interfaces (APIs). Each user interface 260 may include one or more interface elements 310 (represented by "User Interface Element 1" . . . "User Interface Element n" in the figure). For example, users may interact with interface elements in order to access functionality and/or data provided by application and/or data storage layers of the example architecture. Graphical user interfaces may be local or remote. Examples of graphical user interface elements include buttons, menus, checkboxes, drop-down lists, scrollbars, sliders, spinners, text boxes, icons, labels, progress bars, status bars, toolbars, windows, hyperlinks, and dialog boxes. Application programming interfaces may be local or remote. Examples of application programming interface elements include parameterized procedure calls, programmatic objects, and messaging protocols.

FIG. 3B is a diagram illustrating additional details of the elements or components of the application server 265 first presented with reference to FIG. 2. Application server 265 may include one or more application modules 340 (represented by "Application Module 1" . . . "Application Module 1 m" in the figure), each of which may have one or more sub-modules 345. Each application module 340 or sub-module 345 may correspond to a particular function, method, process, or operation that is implemented by the module or sub-module (e.g., a function or process related to providing ERP, CRM, eCommerce or another functionality to a user of the platform). Each application server 265 may include each application module. Alternatively, different application servers 265 may include different sets of application modules. Such sets may be disjoint or overlapping.

FIG. 3C is a diagram illustrating additional details of the elements or components of the data store 270, 275 first presented with reference to FIG. 2. Each data store 270, 275 may include one or more data objects 370 each having one or more data object components 375, such as attributes and/or behaviors. For example, the data store 270, 275 may correspond to a relational database, the data objects 370 may correspond to tables of the relational database, and the data object components 375 may correspond to columns or fields of such tables. Alternatively, or in addition, the data objects may correspond to data records having fields and associated services. Alternatively, or in addition, the data objects may correspond to persistent instances of programmatic data objects, such as structures and classes. Alternatively, or in addition, the data store 270, 275, data objects 370, and data object components 375 may each be any form of data structure as described herein. Each data store in the data storage layer may include each data object. Alternatively, different data stores may include different sets of data objects. Such sets may be disjoint or overlapping.

Example Method

Computer-implemented methods are described herein. In one embodiment, a computing device (such as computer 1005, shown in FIG. 10) with operably connected processor (such as processor 1010) and memory (such as memory 1015) may be implemented with an executable algorithm that configures the processor to perform each method described herein. The method may be performed by at least a processor of computing device that accesses and interacts with memories and/or storage devices. For example, the processor accesses and reads from or writes to the memory to perform the steps described with reference to FIG. 1. These steps may include (i) retrieving any necessary information, (ii) calculating, determining, generating, classifying, or otherwise creating any data, and (iii) storing any data calculated, determined, generated, classified, or otherwise created. In one embodiment, the methods described herein may be performed by the integrated business system 135 described with reference to FIG. 1.

Figure 4:
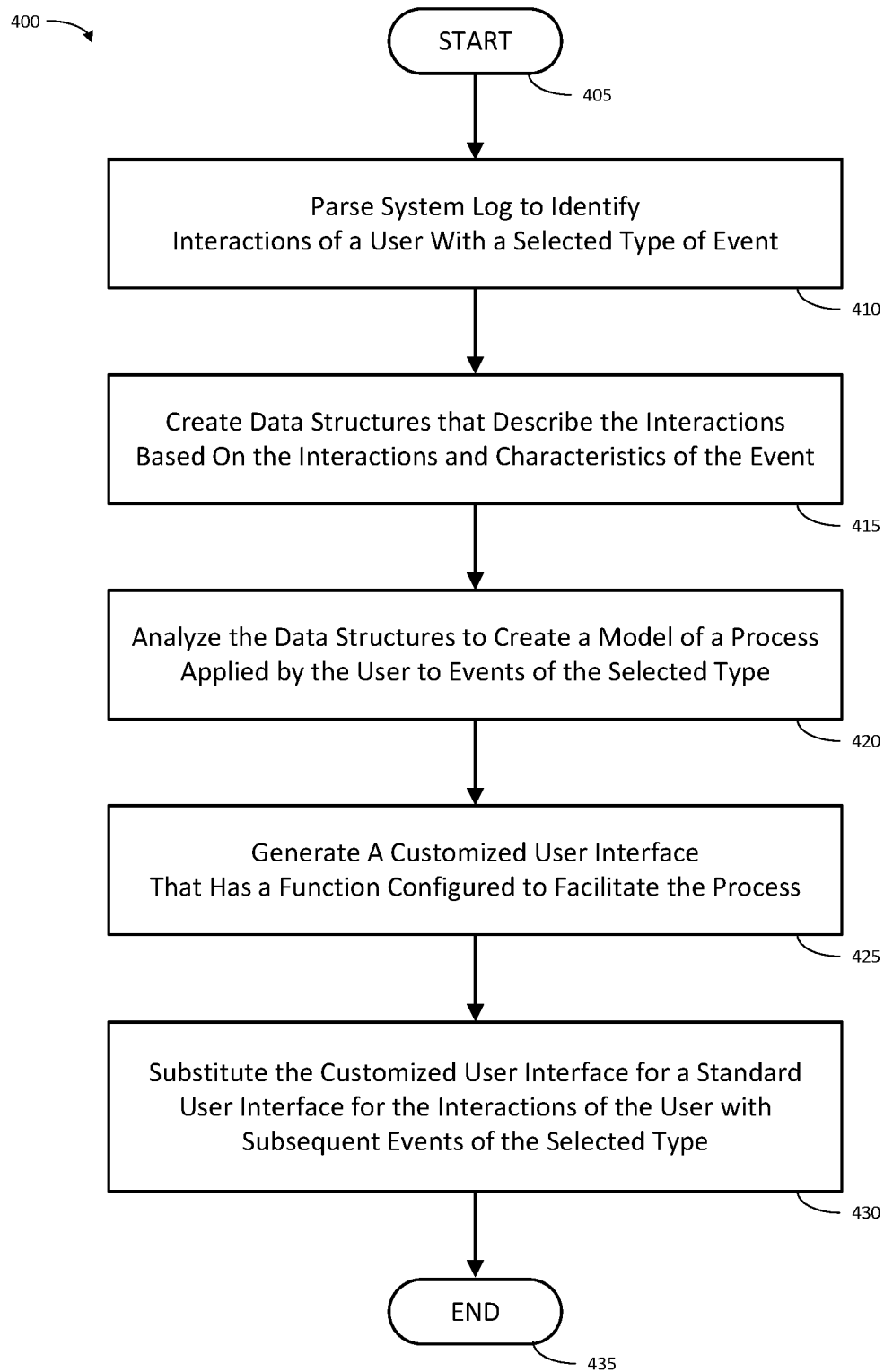
FIG. 4 illustrates one embodiment of a computer-implemented method 400 associated with automated process discovery and facilitation within a cloud business application.

FIG. 4 shows one embodiment of a computer-implemented method 400 associated with automated process discovery and facilitation within a cloud business application. The method 400 describes steps for learning or inferring a user's business process from a user's historical activities and further for generating and presenting the user with a custom user interface configured to facilitate the user process. This allows the integrated business system 135 to control presentation of newly observed actions in a way that reduces the number of user interactions required by the event, thereby reducing demand on the system.

The method 400 may be initiated based on various triggers, such as receiving a signal over network 150 (or parsing data stored in, for example, in system log 190 or service data store 270) indicating that (i) a user (or administrator) of the integrated business system 135 has initiated method 400, or (ii) that that method 400 is scheduled to be initiated at defined times or time intervals. In some embodiments, the method is initiated on a periodic schedule (daily, weekly, bi-weekly, monthly, etc.) in accordance with trigger (ii) above. The method 400 initiates at start block 405 in response to parsing a signal received or stored data retrieved and determining that the signal or stored data indicates that the method 400 should begin. Processing continues to process block 410.

At process block 410, the processor parses a system log of a software platform to identify interactions of a user with each event of a selected type of event. The user is associated with a tenant of the integrated business system 135. Herein, an "event" generally refers to a discrete record of a document or occurrence regarding which the user may take action using the integrated business system 135. For example, possible events include individual purchase orders, bills, sales leads, tasks, time entries, invoices, payroll batches, etc.

In one embodiment, the processor parses the system log 190 to identify all the interactions of the user with events. The parsing may be of a block of historic entries in the system log 190 over a selected period of time. The period may range from the earliest records of system log 190 to the present. The period may also be subsets of that range. In one embodiment, it is desirable to select the period over which the user has been an authorized user of the integrated business system 135. The parsing of the system log 190 results in a set of historical user interactions with each of a set of historical events.

In one embodiment, a data structure describing the historical event (including any base document) need not be stored in the system log 190. Instead, the data structure describing the historical event is stored in a data store associated with application modules of the integrated business system 135 that may perform operations regarding the event. But, the arrival of the historical event into the integrated business system 135, the storage of the data structure describing the historical event, and all actions taken toward the historical event using the integrated business system 135 by any user or by the system 135 itself are recorded in the system log 190. As discussed above, each historical event is recorded as an entry in the system log 190 with (i) the information to identify the event along with (ii) a timestamp indicating when the event occurred. In one embodiment, the information to identify the event includes an event identifier that is unique to the historical event in order to associate the entry in the system log 190 with the event.

In one embodiment, the selected type of events is predetermined. The user may have indicated the selected type of events through a user interface. This may be, for example, by the user selecting the type of events in response to being presented with a dialog that indicates "Select the document types for which you would like to detect your processes for automation:" and allows for selection of the type of events.

In another embodiment, the selected type of events is not predetermined. The processor parses the system log to identify all the types of events that the user has interacted with. The processor composes a query of the system log 190 (and other data stores, if necessary) to retrieve the unique event identifier and event type of each historical event that the user has interacted with. The resulting data may be stored as a data structure in a data store 270 associated with the automated process discovery and facilitation server 195.

In one embodiment, the processor then calculates a count of the unique historical events belonging to each event type. Then, for the count of each event type, the processor compares the count to a threshold for determining whether the event type should be selected for further processing. This threshold may vary from event type to event type, as it should be set based on a subjective sense of whether the user interacts with this type of event often. For example, this threshold may be set at the discretion of an engineer or administrator of integrated business system 135. As a practical matter, the threshold should, at a minimum, not be below a number of unique events required to successfully train a machine learning model on events of the event type. If too few events are available to train the model, the predictive accuracy of the trained model is poor. For example, the machine learning model may require more than 30 unique events of the event type to be trained successfully. For each event type, if the threshold is satisfied, that event type may be the selected event type.

In one embodiment, the processor may at this point present the user with an option to select from among the types of events that satisfy the threshold before parsing the system log 190 for user interactions with events of the selected type. This may be, for example, by the user selecting the type of events in response to being presented with a dialog that indicates "The system has detected that you work regularly with X. Would you like to detect your processes with X for automation?" where X describes the type of event. In another embodiment, the processor may simply proceed to parse the system log 190 for user interactions with events of each type that satisfies the threshold in turn.

In one embodiment, to parse the system log for the user's interactions with events of the selected type of event, the processor composes a query of the system log 190 to retrieve each system log entry which is associated with an event of the selected type of event, and with which the user has interacted. In one embodiment, the query further includes the selected period of time to restrict the historical data. The processor executes the query. The processor parses the returned system log entries to identify the interaction, timestamp, and unique event identifier to create a data structure.

This data structure may be referred to as a collection data structure. In one example, the collection data structure may include collection arrays of interaction-timestamp pairs for each unique historical event of the selected type of event. These arrays may be referred to as collection arrays. The collection arrays may vary in length, and are each as long as the number of interaction-timestamp pairs identified from the returned system log entries. The collection data structure may be stored for example in memory or in a data store 270 associated with the automated process discovery and facilitation server 195. In one embodiment, the collection data structure may be described as a collection of unstructured data.

Recall that there need to be a sufficient number of unique events of a selected type of event in order to successfully train a model. Once all the retrieved system log entries are parsed into collection arrays of interaction-timestamp pairs for each unique historical event, the processor compares the number of events in the list to a threshold that indicates whether there are enough events to successfully train a machine learning model. In one embodiment, this threshold is set to require more than 30 events of the selected type. If the threshold is satisfied, the processor stores an indication (in memory or a data store 270 associated with the automated process discovery and facilitation server 195) or sends a signal that the collection data structure including the collection arrays is ready for further processing into structured data.

In some situations, the individual user has not interacted with enough unique historical events to be able to train the model. But, the user process may also be practiced by other users associated with the tenant (such as other employees of the tenant). Therefore, in one embodiment, the initial restriction to the data of the individual user may be removed, and additional events of the selected type associated with the tenant may be considered. Other expansions of available historical events may be possible.

In one example, the processor prepares and executes a new query of the system log 190 to retrieve all log entries associated with events of the selected type within the period. In another example, the processor prepares and executes a new query of the system log 190 to retrieve all log entries associated with events of the selected type, and with which one or more other users have interacted. In one embodiment, the queries may further include the selected period of time to restrict the historical data.

The processor parses the returned system log entries to identify the interaction, timestamp, and unique event identifier, and adds this information to the collection data structure. For example, new interaction-timestamp pairs for each unique historical event may be (i) added to an existing collection array of the collection data structure if there already exists a collection array for the unique historical event, or (ii) added to a new collection array added to the collection data structure if no collection array for the unique historical event already exists. Again, the processor compares the number of events in the list to a threshold that indicates whether there are enough events to successfully train a machine learning model. If the threshold is satisfied, the processor stores an indication or sends a signal that the collection data structure including the collection arrays is ready for further processing into structured data.

Once the processor has thus parsed the system log of the software platform to identify interactions of the user with each event of the selected type processing at process block 410 completes, and processing continues to process block 415.

At process block 415, for each event, the processor creates a data structure that describes the interactions with the event based at least in part on (i) the identified interactions and (ii) one or more characteristics of the event. This data structure may be referred to as an event data structure. The creation of the event data structure applies a consistent structure to input and output variables describing the event for provision to a machine learning model. In one embodiment, the output variables included in the event data structure are derived from interactions collected in a collection array associated with that event. In one embodiment, the input variables included in the event data structure are characteristics associated with the event and retrieved from data stores 270, 275 associated with the various modules.

Process block 415 may commence in response to the processor parsing the indication or the signal that the collection data structure including the collection arrays is ready for further processing into structured data.

The interactions with the events of the selected type of event identified in process block 410 can be considered to be outputs of a function of characteristics associated with the selected type of event. The function for arriving at these outputs may be initially unknown or not recorded in the integrated business system 135. But, because both the historical outputs and the values of the characteristics are recorded in the integrated business system 135, the function can be derived.

Not all of the interactions stored in the collection arrays of interaction-timestamp pairs are substantive interactions. Non-substantive interactions may not be necessary to describe the operation of the function. For example, interactions that are simple views of the event generally may be disregarded. The processor may parse the collection arrays to identify and remove non-substantive interactions. (Alternatively, non-substantive interactions may be filtered at process block 410, and not recorded by the processor in the collection arrays).

Substantive interactions are generally those in which the user assigns or changes some status or value associated with the event. Substantive interactions or example, the status of a purchase order event may be changed from "not approved" to "approved", a delivery speed for fulfillment of the purchase order event may be assigned a value (such as 1, 2, 5, or 10-day delivery), a business expense event may be associated with a particular customer's account, etc. These interactions therefore reflect specific types of outcomes for their associated event—approval status change, and delivery speed selection.

In one embodiment, the particular set of outcome types associated with the selected type of event are dictated by the type of event. Generally, there is an outcome type for each possible action that a user may take with respect to an event of the selected type. For example, if, for one type of specific event, a user may only approve or disapprove the event, the selected type of event will have only one outcome type. In one embodiment, the processor detects the type of the selected type of event. Associations between the various types of event and the type(s) of outcome for that type of event are stored in memory or storage, such as in a data structure in system data store 270. The processor retrieves the type(s) of outcome associated with the selected type of event from memory or storage. Each of the type(s) of outcome can be represented by outcome variables O1, O2, . . . , On, where n is the number of types of outcome possible for the selected type of event.

In one embodiment, the processor parses the collection arrays to identify the interactions that are outcomes, and further to identify the type of outcome. A unique event associated with a collection array is also associated with a set of outcome variables O1-On representing the values of the possible types of outcome for that unique event. The processor parses the collection array for the unique event and, if an interaction is one of any of the possible types of outcome for the selected type of event, the processor assigns the value of that outcome to the appropriate outcome variable in memory or storage. In one embodiment, more than one interaction in the collection array may be of the same type, for example if a user initially selects 5-day shipping for a purchase order and then later changes it to 1-day shipping. Operating under the assumption that the latest outcome is final, the processor may then overwrite the outcome value previously stored, if the associated timestamp is later. The processor may set to NULL any outcome variables for which no value is found in the collection array. The processor may repeat this process for each collection array, until the outcomes for each unique event are identified.

In one embodiment, the particular set of characteristics associated with the selected type of event is dictated by the type of event. For example, where the event is a sales order, the characteristic information may include variables for (i) customer characteristics (such as customer priority, value of the customer, and customer location) of the customer that the sales order is for, (ii) sales representative characteristics of the sales representative that issued the sales order, (iii) item characteristics (such as inventory availability, item weight, and item size) associated with the items to be sold under the sales order, and (iv) order characteristics (such as desired/target date and monetary value of the order) of the sales order itself. In another example, where the event is a payroll batch, the characteristic information may include variables for (i) employees and employee characteristics, including salary/wages, benefits and other deductions, and tax withholding choices, (ii) timesheets, and (iii) prior payroll batches and payments.

In one embodiment, the processor detects the type of the selected type of event. An association between the selected type and the variables and location(s) (such as particular data stores to be searched) of the characteristics is stored in memory or storage, such as in a data structure in system data store 270. The processor retrieves type from memory or storage the characteristic variables associated with the selected type and the storage locations in which values of the characteristic variables can be found. The processor creates one or more queries to retrieve the values for the characteristic variables from the appropriate locations(s). The processor executes the one or more queries to retrieve values of the characteristic variables. The returned values of the characteristic variables for each event are stored in a characteristic vector C, for example as a data structure in system data store 270. The characteristic vector C is of the form $C=(c_1, c_2, \ldots, c_n)$, where n is the total number of characteristics for the selected type of event. Each dimension of the vector $c_1$-$c_n$ is associated with a specific characteristic variable, and the processor assigns the retrieved value of the characteristic variable in to the associated dimension of the vector.

Thus, for each unique event of the selected type indicated in the collection data structure, the processor retrieves the characteristic information values associated with unique event of the selected type, and stores it in a characteristic vector.

The values of the characteristics may be retrieved from data stores 270, 275 associated with the various modules (for example, modules 155-185) of the integrated business server

140. The processor may execute one or more queries of the data stores to retrieve the values of the characteristics.

For each unique event of the selected type, the processor creates a data structure including the values of the historical outcome variables O1, . . . , On, and the characteristic vector C. This data structure may be referred to as an interaction data structure. In one embodiment, the interaction data structure is an array of the form (O1, . . . , On, C), where each 0 variable is a type of outcome based on the identified interactions and where n is the total number of types of outcome. The interactions with the events and the characteristics are now represented as structured data suitable for use with a machine learning model.

Once an interaction data structure has been created for each historical event of the selected type, the processor stores an indication or sends a signal that the interaction data structures are ready for further processing to train a machine learning model.

Once the processor has thus created the data structure(s) that describes the interactions with the event based at least in part on the identified interactions and the one or more characteristics of the event, processing at process block 415 completes, and processing continues to process block 420.

At process block 420, the processor analyzes the data structures to create a model of a process applied to events of the selected type by the user. Process block 420 may commence in response to the processor parsing the indication or the signal that the interaction data structures are ready for further processing.

A value of an outcome for a subsequent (not yet observed) event can be predicted by building a model based on the characteristics. Regression models can be formed to predict the numerical value of an outcome from one or more numerical and/or categorical characteristic values. Classification models can be formed to predict the categorical value of an outcome from one or more numerical and/or categorical characteristic values. Generally, a discrete model based on the characteristics is prepared for each outcome type.

In one embodiment, the processor may implement a decision tree building algorithm (such as the Iterative Dichotomizer 3 (ID3), C4.5, and Classification And Regression Tree (CART) algorithms) to analyze the interaction data structures and form a model for each possible outcome type. The model may be a decision tree regression model if the outcome type is numeric. The model may be a decision tree classification model if the outcome type is categorical.

In one embodiment, the processor retrieves the set of the interaction data structures. The processor divides the set of the interaction data structures into two subsets—a training set of interaction data structures, and a validation set of data structures. For example, the processor may divide the set by placing a randomly selected 50% of the interaction data structures into the training set, and placing the remaining data structures into the validation set.

In one embodiment, for each of the possible outcome types, the processor builds and validates a decision tree model. The processor applies the decision tree building algorithm to the training set to build a decision tree model for the possible outcome type. The processor stores the decision tree model in memory or storage. The processor then provides the validation set to the decision tree model to predict the outcome of the outcome type for each interaction data structure of the set. The processor compares the predicted outcomes and the historical outcomes (provided in the interaction data structure). If the predicted and historical outcomes correlate within a predetermined tolerance threshold (for example, no more than 5% difference between the predicted and historical outcomes), the validation is successful, and the processor stores an indication in memory or sends a signal indicating that the model for that outcome type is finalized (ready for use). If the predicted and historical outcomes do not correlate within the predetermined tolerance threshold, (i) the training and validation sets may be re-sampled, and the model re-built and re-validated based on the new training and validation sets, or (ii) the process may abort, and no model will be finalized.

In one embodiment, the tolerance threshold may vary based on the type of event evaluated. In various embodiments, the tolerance threshold may be predetermined or adjusted by the user, an administrator or engineer of the integrated business system 135, or other authorized persons.

The built and successfully validated decision tree model is a model of a process applied to events of the selected type by the user to arrive at the value for the outcome type. The decision tree model can now be substituted for the business process/algorithm that the user is manually applying (consciously or not) to events of the selected type. If the set of historic events is an accurate reflection of the user's business logic/algorithm, the decision tree model should predict the same outcome value (within the predetermined tolerance threshold) as the user's manual process for all subsequent events.

In one embodiment, additional decision tree models for the additional outcome types can also be built following the same procedures. For example, the processor may analyze the interaction data structures as discussed above to create a second model of a second process applied to the events of the selected type by the user to arrive at a value for a second outcome type. The processor may build a decision tree model to approximate the user's manual process for arriving at a value for each outcome type.

Once the processor has thus analyzed the data structures to create the model of the process applied to events of the selected type by the user, processing at process block 420 completes, and processing continues to process block 425.

At process block 425, the processor generates a customized user interface that is configured to facilitate the process based on application of the model to a set of one or more subsequent events.

In one embodiment, process block 425 may initiate in response to the processor parsing the indication in memory or signal indicating that the model for an outcome type is finalized. For example, process block 425 may initiate to generate the customized user interface based on (i) a model for only one type of outcome being completed, or (ii) a model for each type of outcome being completed.

In one embodiment, the customized user interface includes a graphical user interface.

In one embodiment, the processor selects a template user interface from a library of user interface templates. The templates may be stored as data structures in memory or storage, for example as data objects 370 in system data store 270. The user interface templates in the library include one or more functions configured to process the predicted outcome values provided by one or more models created at process block 420. The functions include, but are not limited to highlight, sort/group, apply outcome, and display predicted outcome functions. each of these functions is configured to facilitate the user's process (or business logic or algorithm).

In one embodiment, a sort/group function is configured to sort one or more events displayed with the customized user interface based on a predicted outcome assigned to the event by a model. The events may be sorted in ascending or descending order based on the predicted outcome. The sort/group function may implement any of several known sorting algorithms, including but not limited to merge sort, insertion sort, bubble sort, quick sort, or heap sort algorithms. Where the outcome is a numerical variable, the function operates as a sort function, and where the outcome is a categorical variable, the function as a group function.

In one embodiment, a highlight function is configured to apply a visible highlight to one or more events based on a predicted outcome assigned to the event by a model. The highlight function is configured to emphasize an event in the customized user interface, for example (i) by bolding, italicizing, or underlining text related to the event, (ii) by changing the color of the text related to the event, and/or (iii) adding color to a region (such as a table cell or row) surrounding the text relating to the event. The highlighting may appear or disappear in response to a user action, for example selecting an option to show/disable highlighting, or in response to a cursor hovering over a button that will activate an apply action function regarding the highlighted events. The highlight function is configured to apply a different form of emphasis (such as a different color) for each outcome type provided. Where the outcome type is categorical, the highlight function may be configured to display a different form of emphasis for each category. Where the outcome type is numerical, the highlight function may display emphasis or not based the predicted outcome satisfying a threshold.

In one embodiment, an apply action function is configured to automatically apply a specific action to the subsequent event—that is, to automatically assign the value of the predicted outcome for one or more events to be the user's action on the one or more events. In one embodiment, the function is configured to display a button or hyperlink that, upon selection by the user, causes the function to assign the value of the predicted outcome for one or more events to be the user's action on the one or more events. This is often used in conjunction with the highlight function. For example, the function is configured to to indicate a subsequent event to be subject to the specific action by causing the subsequent event to be displayed with highlighting relative to other events. The button or hyperlink may be described (for example in text that appears when a cursor hovers over the button or hyperlink, or adjacent to the button or hyperlink) as applying the function to the events that are highlighted. In one embodiment, the user interface templates include a region for displaying one or more buttons or hyperlinks to apply one or more actions. In another embodiment, the apply action function is configured to automatically apply the specific action to the subsequent event without awaiting and receiving user confirmation by way of a button or hyperlink. In this configuration, buttons or hyperlinks associated with the apply action function are not displayed.

In one embodiment, a display predicted outcome function is configured to display a predicted outcome for an event, for example as a column in a display listing the events.

In one embodiment, the processor can request that the user provide names or other input describing for the user's processes or business logics or algorithms, and apply the description in the functions of the customized user interface. For example, the processor may highlight certain events based on a predicted outcome of a particular outcome type for those events and present the user with a dialog, such as: "The system has detected that you handle the highlighted events in the same way. Please enter a short description of this action (20 characters maximum):" followed by a text field for receiving a response. The processor will accept the string entered in that field, and then use the string as the text of the button for the apply action function for that outcome type. In another example, the user may be presented with the option to select a color with which to highlight events for each of one or more outcome types. The processor may similarly solicit titles for a column of displayed predicted outcomes, or for other interface elements.

As discussed above, the processor may analyze the interaction data structures to create additional models of additional processes applied to the events of the selected type by the user. Thus, the customized user interface may be configured to facilitate these additional processes in addition to facilitating a single process.

In one embodiment, the processor selects a template user interface from the library of user interface templates based on the selected type of event and its associated outcome types. For example, for a selected type of event that has four associated outcome types, three of which are user actions and the fourth is the order in which the user handles the events, the processor will select a template user interface that is configured to include three apply action functions, the highlighting function, and the sort/group function. The template user interface is configured with a region for displaying the buttons/hyperlinks to activate the apply action functions. The user may be presented with the opportunity to name these apply action functions, as discussed above.

The functions are configured to accept as input, for each event of the selected type of event, at least the predicted outcome of one outcome type and information associating that predicted outcome with the event (such as the unique event identifier). In one embodiment, the functions are configured to accept interaction data structures as input. In one embodiment, the functions are configured to accept the outcome fields of the interaction data structures and unique event identifier as inputs. In one embodiment, the functions are configured to accept the outcome fields of the interaction data structures and the event as inputs.

In one embodiment, the processor configures each apply action function in the selected template interface to accept as input a specific one of the outcome fields. The processor also configures the highlight function in the selected template interface to accept as input the outcome fields selected as inputs to each apply action function. For outcome fields that are numerical, the processor also configures a threshold for applying emphasis (highlighting). The processor also configures the sort/group to accept as input a specific one of the outcome fields. In one embodiment, these configurations are dictated based on the selected type of event and its associated outcome types.

For example, in the example template for an event that has four associated outcome types discussed above, (i) the processor configures the first apply action function to accept the first outcome field and unique event ID as input, the processor configures the second apply action function to accept the second outcome field and unique event ID as input, and the processor configures the third apply action function to accept the third outcome field and unique event ID as input; (ii) the processor configures the highlight function to accept the first, second, and third outcome fields and the unique event ID as input, and also configure a threshold for highlighting any the numerical outcome fields; and (iii) the processor configures the sort/group function to accept the fourth outcome field as input.

Once the processor has configured the template user interface, the processor finalizes the template and make it available for use in the integrated business system 135 as a customized user interface. In one embodiment, the processor stores the new customized user interface as a data object in a data store 275 associated with the tenant and/or user. The processor may also store an indication in memory or send a signal indicating that the new customized user interface is available for use.

Once the processor has thus generated the customized user interface that is configured to facilitate the process based on application of the model to a set of one or more subsequent events, processing at process block 425 completes, and processing continues to process block 430.

At process block 430, the processor substitutes the customized user interface for a standard user interface when generating and/or transmitting instructions to display one or more subsequent events of the set. In one embodiment, process block 430 starts in response to the processor parsing the indication or signal that the new customized user interface is available for use.

In one embodiment, the processor stores an indication in memory or in storage that the user should be presented with the customized user interface when the system 135 receives a command to present the user with one or more subsequent events of the selected type of event. A computing device associated with the user initiates such a command, which is parsed by the processor. In response to the command, the processor substitutes the customized user interface for a standard user interface when generating and/or transmitting instructions to display one or more subsequent events of the set.

For example, in one embodiment, the processor generates instructions to display one or more subsequent events of the set using the customized user interface, instead of generating instructions to display the one or more subsequent events using the standard user interface. In another embodiment, the processor transmits instructions to display one or more subsequent events of the set using the customized user interface, instead of transmitting instructions to display the one or more subsequent events using the standard user interface. In another embodiment, the processor generates instructions to cause the one or more subsequent events of the set to be displayed using the customized user interface, instead of generating instructions cause the one or more subsequent events to be displayed using the standard user interface. In another embodiment, the processor transmits instructions to cause the one or more subsequent events of the set to be displayed using the customized user interface, instead of transmitting instructions to cause the one or more subsequent events to be displayed using the standard user interface. In each of these example embodiments, the processor may transmit the instructions over a network to the computing device associated with the user.

In one embodiment, the processor displays (for example using a display device such as display 1070) the one or more subsequent events of the set with the customized user interface using the instructions. In another embodiment, the processor displays the one or more subsequent events of the set with the customized user interface in response to receiving the transmitted instructions.

In one embodiment, because the model is associated with only one user of the software platform (the integrated business system 135), the customized user interface is provided only to the one user exclusively of other users of the software platform.

In one embodiment, because the model is associated with a tenant the software platform through the tenant's association with the user, the customized user interface may be provided both to the user and to one or more other users associated with the tenant.

Once the processor has thus substituted the customized user interface for the standard user interface when generating and/or transmitting instructions to display one or more subsequent events of the set, processing at process block 430 completes. Processing continues to end block 435, where method 400 completes.

As a result of implementing the systems and methods (such as method 400) described herein, the load on the software platform (the integrated business system 135) is reduced because computing and network resources need no longer be dedicated to continuously providing the cloud business application to the user while the user repeatedly performs interactions with the standard user interface. Instead, the resources need only be provided long enough for the user to interact with the customized user interface. Cumulatively over many users, this can add up to significant load reduction on the integrated business system 135, and result in improved performance and reduced infrastructure demand compared with integrated business systems that have not implemented the method 400.

Further, the problem of repeated manual interactions with a computer due to the limits imposed on those interactions by a standard user interface is a problem specifically arising in computing, and which does not arise outside of computing. In particular, the problem arises where a user's process for interacting with a computerized event is not consistent with the functions of the standard user interface. The systems and methods (such as method 400) described herein apply computing processes to overcome this problem—specifically applying machine learning to discover the user's process and facilitate that process with a customized user interface. The problem is overcome based on the specific steps described herein (for example with reference to the method 400) to discover the process and provide an improved, customized user interface. The problem could not be resolved by brute force application of computing power to the standard user interface, at least because the additional computing power does nothing to speed the user's interactions with the standard user interface. Accordingly, the methods and systems described herein may be described as systems and methods for overcoming the limitations of a standard user interface with automated process discovery and facilitation, Intelligent List Ordering In any queue of actionable events, whether they are tasks, orders to fulfill, leads to call, approvals, or other items or objects, the standard user interface presents the events to the user using some default ordering. The user must then decide which item to address next, and manually select it from among the presented events. Application of machine learning can be used to learn or infer the algorithm that the user is manually applying to decide which item to address next. A customized user interface can be implemented which applies a model of the user's process to newly observed events, and displays the events in a priority ordering that presents the events in the order that the user is likely to handle them.

Figure 5:
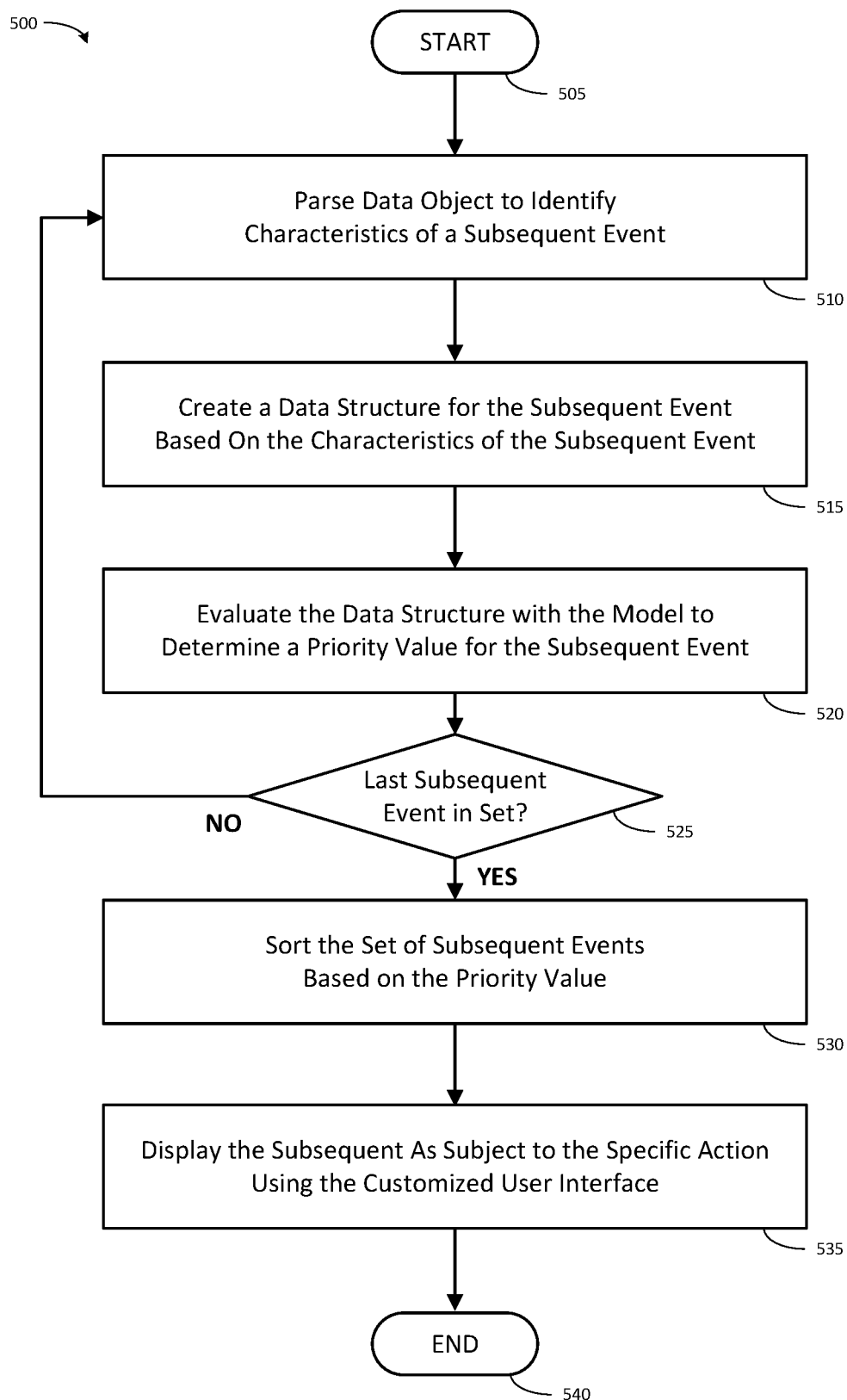
FIG. 5 illustrates one embodiment of a computer-implemented method associated with automated process facilitation of subsequent events within a cloud business application.

FIG. 5 shows one embodiment of a computer-implemented method 500 associated with automated process facilitation of subsequent events within a cloud business application. The method may be initiated based on various triggers, such as receiving a signal over network 150 (or parsing data stored in, for example, in system log 190 or service data store 270) indicating that, for example, (i) one or more subsequent events have arrived in the integrated business system 135, or (ii) the user has requested to view one or more subsequent events using integrated business system 135. The method 500 initiates at start block 505 in response to parsing a signal received or stored data retrieved and determining that the signal or stored data indicates that the method 500 should begin. Processing continues to process block 510.

At process block 510, the processor parses a data object to identify one or more characteristics of the subsequent event. In one embodiment, the subsequent events are the newly observed events that arrive or occur in the integrated business system 135 at a time when they can be (i) processed by a model completed as described with reference to process block 420 and (ii) displayed using a customized user interface generated as described with reference to process block 425. In one embodiment, the particular characteristics of the subsequent event are dictated by the type of event, as discussed above with reference to process block 415. The values of the characteristics are stored in one or more data structures associated with the subsequent event. For example, the data structure may be a data object 370 associated with the subsequent event and stored in a data store 270, 275 associated with a module of the integrated business system 135.

In one embodiment, the processor parses a data object to identify one or more characteristics of the subsequent event as follows. The processor detects the type of the subsequent event. The processor retrieves from memory or storage (i) the characteristic variables associated with the type of the subsequent event, and (ii) the storage locations in which values for the characteristic variables can be found (as discussed above with reference to process block 415). The processor creates one or more queries to retrieve values of the characteristic variables stored in one or more data objects. The processor executes the one or more queries and stores the returned values of the characteristic variables as the dimensions of a characteristic vector C (as discussed above with reference to process block 415). The processor associates the characteristic vector C with a unique identifier of the subsequent event.

Once the characteristic vector C is populated and associated with a unique identifier of the subsequent event, the processor stores an indication in memory or sends a signal that the characteristic vector is complete.

Once the processor has thus parsed the data object to identify the one or more characteristics of the subsequent event, processing at process block 510 completes, and processing continues to process block 515.

At process block 515, the processor creates a subsequent event data structure based on the one or more characteristics of the subsequent event. The processor may begin processing at process block 515 in response to the indication or signal that the characteristic vector is complete.

In one embodiment, the processor creates an interaction data structure of the form described with reference to process block 415, where the interaction data structure includes (i) an outcome variable for each type of outcome associated with the type of event, and (ii) the characteristic vector C. The processor detects the type of event and retrieves the types of outcome associated with the event type from memory or storage. The processor sets the values of the outcome variables to null for later modification by the machine learning model(s). The processor creates an interaction data structure including the values of each of the outcome variables and the characteristic vector C. The events are now represented as structured data suitable for use with the machine learning model(s).

Once the interaction data structure is complete, the processor stores an indication in memory or sends a signal that the interaction data structure is complete.

Once the processor has thus created the subsequent event data structure based on the one or more characteristics of the subsequent event, processing at process block 515 completes, and processing continues to process block 520.

At process block 520, the processor evaluates the subsequent event data structure with the model to determine a priority value associated with the process for the subsequent event. The processor may begin processing at process block 520 in response to parsing the indication or signal that the interaction data structure is complete.

In one embodiment, the processor provides the interaction data structure to the one or more finalized machine learning models created as described with reference to process block 420. At least one of the finalized machine learning models is trained to approximate a prioritization process of the user. The outcome of the model is a priority value associated with the prioritization process. The processor executes the at least one of the finalized machine learning models on the interaction data structure to determine the priority value associated with the prioritization process for the subsequent event. The processor stores the priority value as a data structure in storage or memory. The processor associates the priority value with the subsequent event in storage or memory.

In one embodiment, the priority value is based, at least in part, on a delay from a first time that the system log indicated that the user logged in to the software platform to a second time that the system log indicated that the user took action on an other event. The other event is (i) of a same selected type as the subsequent event and (ii) has similar characteristics to characteristics of the subsequent event. In one embodiment, delay values are the outcome of the prioritization process. In one embodiment, the delay was provided to the model in the interaction data structure as an outcome during the training of the model. In one embodiment, the priority value determined above is a delay value.

Once the processor has thus evaluated the subsequent event data structure with the model to determine the priority value associated with the process for the subsequent event, processing at process block 520 completes, and processing continues to decision block 525.

The steps of process blocks 510-520 may repeat in a loop to process each subsequent event in the set of subsequent events. Therefore, at decision block 525, the processor determines if the subsequent event is the last event in the set of subsequent events. If the subsequent event is not the last event in the set of subsequent events, processing continues to process block 510, where the process will be applied to the next event in the set. If the subsequent event is the last event in the set, processing continues to process block 530.

At process block 530, the processor sorts the set of subsequent events in an order of priority based on the priority value for each subsequent event.

In one embodiment, the processor performs this sort by executing the sort/group function (described with reference to process block 425) of the customized user interface. The processor retrieves a priority value for each event of the set of subsequent events. The processor compares the priority value for each event with a priority value for at least one other event in the set, in accordance with the sorting algorithm implemented by the sort/group function. The processor stores each event in order of priority based on the comparisons in a data structure such as an array in memory or storage. The sort may be in ascending or descending order of priority.

Note that, in one embodiment where the priority value is a delay value, a high priority value for an event (representing a long delay) indicates that the user places low priority on handling the event.

After the sort is completed, the processor stores an indication in memory or sends a signal that the sort is completed.

Once the processor has thus sorted the set of subsequent events in an order of priority based on the priority value for each subsequent event, processing at process block 530 completes, and processing continues to process block 535.

At process block 535, the processor transmits the subsequent events for display in the order of priority using the customized user interface. The processor may begin process block 535 in response to parsing the indication or signal that the sort is completed. The processor retrieves the sorted array of events. The processor transmits the sorted array of events to a computing device associated with the user. The processor transmits an instruction to the computing device to display the sorted array of events in order of priority using the customized user interface.

Once the processor has thus transmitted the subsequent events for display in the order of priority using the customized user interface, processing at process block 535 completes. Processing continues to end block 540, where method 500 completes.

FIG. 6A shows an example standard user interface 600. In one embodiment, the standard user interface 600 may be a graphical user interface served to a computing device associated with a user (such as one of personal computers 115 or remote user computers 125) and presented to the user on a display device controlled by that computing device. In one embodiment, the standard user interface 600 may be served as a web page by web interface server 145 to the computing device associated with the user. The standard user interface 600 presents a set of events 605-650 in a default order. In this example, the events are purchase orders pending approval. The events are presented in ascending order of age, with the most recent event (purchase order 605) presented at the top. In one example, the order in which the standard user interface presents the events can be adjusted by the user. This may be done, for example, by clicking on the column headers 655 at the top of each column. This will sort the events in an order based on the column. For instance, selecting the "NAME" header may sort the events in ascending or descending alphabetical order of name. Or, selecting the "AMOUNT" header may sort the events in ascending or descending numerical order of purchase order amount.

But, these different orderings of the events may not reflect or even approximate the actual order in which the user will handle the events. Further, the user may also consider factors not shown in the standard user interface 600 when deciding the order to handle the events. For example, the other factors may only be visible after first selecting the "View" link 660 associated with the event, which will cause the standard user interface 600 to present additional details regarding the event.

FIG. 6B illustrates an example customized user interface 675 customized in accordance with the method presented with reference to FIG. 5. Each of the events presented by the customized user interface 675 has been evaluated with the model of the user's process to determine a priority value associated with the process for the event—a priority value that predicts the priority in which the user will handle that event. While in this embodiment the priority value is not itself presented to the user, its effects are shown by the order of event presentation. The customized user interface 675 includes a function that displays the events in order of priority based on the priority value for each subsequent event, rather than any of the available orderings present in the standard interface.

In one embodiment, the priority value assigned to an event reflects a prediction of the order in which the user will take action on an event in a set of events. In one embodiment, this priority value may be expressed as a timing variable T. T may represent, for example, a time between the user login to the integrated business system 135 and taking an action regarding the event. Alternatively, T may represent a time between the user's request to view a screen that presents the set of events (such as standard user interface 600 or customized user interface 675) and taking an action regarding the event. T is an output variable representing a function of observed characteristics presented to the model.

In the context of the purchase order handling example, historical data regarding the timing of purchase order handling by the user is used to create the model. For each event in a set of historic events, the observed value of timing variable T and a set of observed values of characteristics associated with the purchase order are provided to train the model (as described with respect to method 400). Characteristics of subsequent purchase orders that are to be presented with customized user interface 675 are provided to the model for application of a predicted value of timing variable T. The predicted value of timing variable T serves as the priority value that predicts the priority in which the user will handle that event.

For example, the historical data may show that the user will almost always handle purchase orders from Good Customer Co. before any other purchase orders. The user's activity may reflect a business process that emphasizes quick order turnaround for a valued customer. Accordingly, the model has been trained to apply a high priority value to purchase orders from Good Customer Co. This is reflected in the presentation of events in customized user interface 675: all purchase orders from Good Customer Co. (605, 650, and 680) are presented first. Further, at least one of these high priority purchase orders (purchase order 680) has been brought up from a "below-the-fold" position that was not visible in the standard user interface 600 without scrolling through the list or linking to a subsequent page.

The historical data may also show that the user delays handling purchase orders over $200,000 until after all other orders from existing customers are handled. The user's delay may reflect a business process that requires additional supervisor consultation on large orders. Accordingly, the model has been trained to apply a lower priority value to purchase orders for over $200,000. This is also reflected in the presentation of events in customized user interface 675: the $252,750 purchase order from Big Buyer Inc. (purchase order 615) is presented behind all orders from existing customers. This placement differs from the ordering in the standard user interface 600, which showed purchase order 615 third in the list, but ahead of other orders that the user would handle first.

Further, each time the user interacts with an event item from the list, the interaction provides feedback on the accuracy of the model. These interactions are recorded in system log 190. Thus, for example, the system can observe whether the user addressed the first event on the list or an event lower on the list. In one embodiment, the customized user interface 675 may also have the ability to move events up or down the priority list, which would also provide direct feedback on the accuracy of the model. This may be accomplished by including move up/down buttons 685 for each event in the list, or by a hyperlink to move to top/bottom or up/down that is presented following a selection (for example by right click of a mouse) of the event. Selecting a move up button or hyperlink switches the placement of an event with the event immediately above it in the list, while selecting a move down button or hyperlink switches the placement of the event with the event immediately below it in the list. Selecting a move to top/bottom hyperlink removes the event from its present position in the list and inserts the event at the top or bottom of the list, respectively. These 'move' interactions are also recorded in the system log 190. The model can then be retrained based on the additional interactions or the movement of event up and down the priority list that are recoded in the system log 190.

Thus, the ordering of the purchase orders in the customized user interface 675 more accurately reflects the user's process than does the standard user interface 600, and thus facilitates the user's process. Example use cases for this intelligent list ordering/prioritization include tasks to do, orders to fulfill, sales leads to call, objects to approve (including expense reports, purchase requisitions, timesheets, and others), invoices to bill, bills to pay, and any other set of actionable events that may be handled in series.

Generic User Process and Decision Algorithm Repetition

Many user interactions with the integrated business system 135 are repeated actions or series of actions. The user's interactions observed in the past are likely not random, but rather based on some specific process or business logic unknown to the operator of the integrated business system 135. The process is likely to be known to the user, but in some cases, the user may not be conscious of the process he or she follows. Thus, the integrated business system 135 can apply machine learning to learn/infer the process/steps that the user takes as well as the algorithm that the user uses (consciously or not) to make decisions during the process. A customized user interface can be implemented which applies a model of the user's process to newly observed events, and displays an indication (such as highlighting) that the newly observed events are subject to some specific action under the user's process in order to facilitate the user's handling of the events. Further, the customized user interface can be implemented to include an element allowing the user to indicate that the specific action should be automatically applied to the events.

Figure 7:
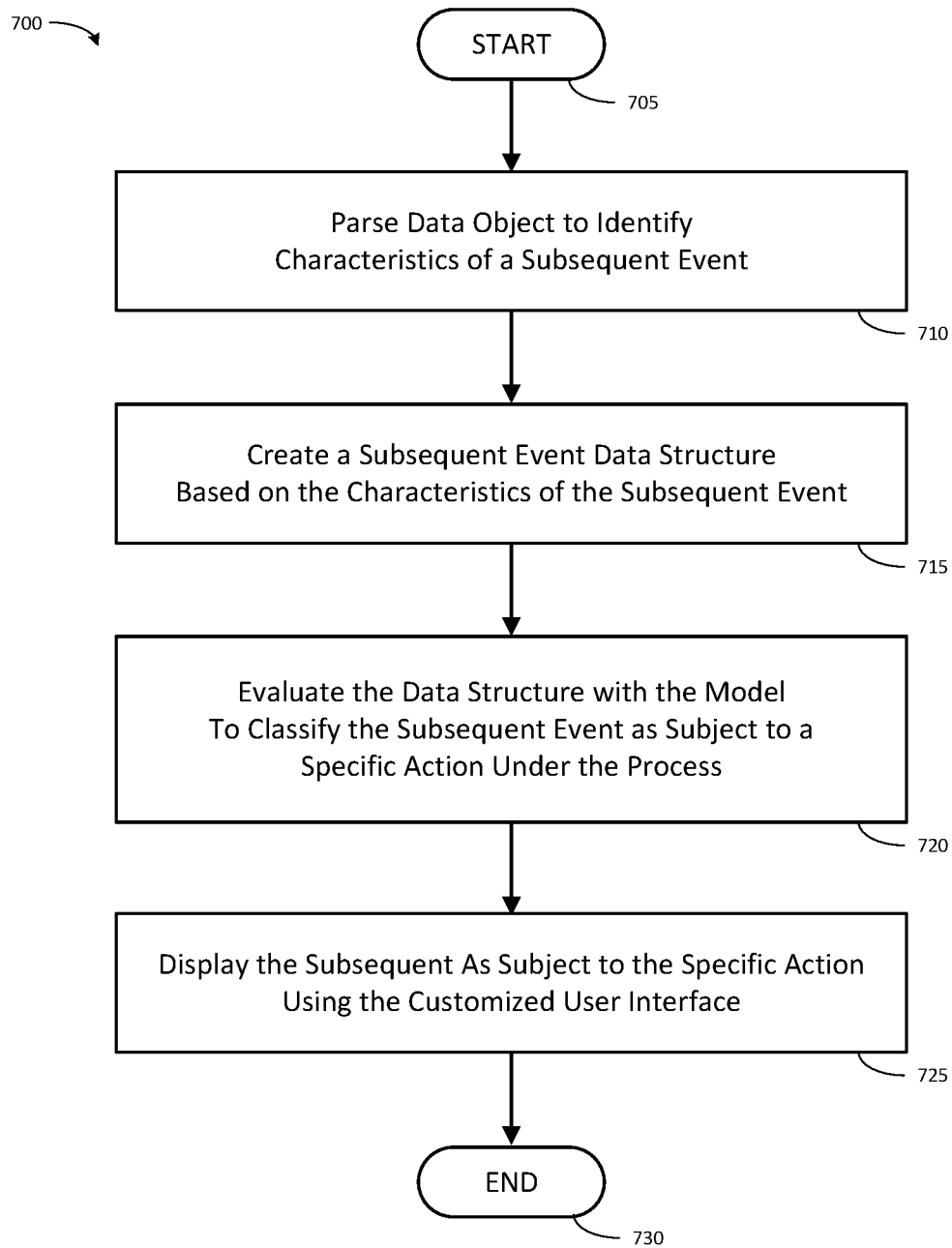
FIG. 7 illustrates another embodiment of a computer-implemented method associated with automated process facilitation of subsequent events within a cloud business application.

FIG. 7 shows another embodiment of a computer-implemented method 700 associated with automated process facilitation of subsequent events within a cloud business application. The method may be initiated based on various triggers, such as receiving a signal over network 150 (or parsing data stored in, for example, in system log 190 or service data store 270) indicating that, for example, (i) one or more subsequent events have arrived in the integrated business system 135, or (ii) the user has requested to view one or more subsequent events using integrated business system 135. The method 700 initiates at start block 705 in response to parsing a signal received or stored data retrieved and determining that the signal or stored data indicates that the method 700 should begin. Processing continues to process block 710.

At process block 710, the processor parses a data object to identify one or more characteristics of the subsequent event. This process may be performed as described with reference to process block 510.

In one embodiment, the processor parses a data object to identify one or more characteristics of the subsequent event as follows. The processor detects the type of the subsequent event. The processor retrieves from memory or storage (i) the characteristic variables associated with the type of the subsequent event, and (ii) the storage locations in which values for the characteristic variables can be found (as discussed above with reference to process block 415). The processor creates one or more queries to retrieve values of the characteristic variables stored in one or more data objects. The processor executes the one or more queries and stores the returned values of the characteristic variables as the dimensions of a characteristic vector C (as discussed above with reference to process block 415). The processor associates the characteristic vector C with a unique identifier of the subsequent event.

Once the characteristic vector C is populated and associated with a unique identifier of the subsequent event, the processor stores an indication in memory or sends a signal that the characteristic vector is complete.

Once the processor has thus parsed the data object identify the one or more characteristics of the subsequent event, processing at process block 710 completes, and processing continues to process block 715.

At process block 715, the processor creates a subsequent event data structure based on the one or more characteristics of the subsequent event. This process may be performed as described with reference to process block 515. The processor may begin processing at process block 715 in response to the indication or signal that the characteristic vector is complete.

In one embodiment, the processor creates an interaction data structure of the form described with reference to process block 415, where the interaction data structure includes (i) an outcome variable for each type of outcome associated with the type of event, and (ii) the characteristic vector C. The processor detects the type of event and retrieves the types of outcome associated with the event type from memory or storage. The processor sets the values of the outcome variables to null for later modification by the machine learning model(s). The processor creates an interaction data structure including the values of each of the outcome variables and the characteristic vector C. The events are now represented as structured data suitable for use with the machine learning model(s).

Once the interaction data structure is complete, the processor stores an indication in memory or sends a signal that the interaction data structure is complete.

Once the processor has thus created the subsequent event data structure based on the one or more characteristics of the subsequent event, processing at process block 715 completes, and processing continues to process block 720.

At process block 720, the processor evaluates the subsequent event data structure with the model to classify the subsequent event as subject to a specific action under the process. The processor may begin processing at process block 715 in response to the indication or signal that the interaction data structure is complete.

In one embodiment, the processor provides the interaction data structure to the one or more finalized machine learning models created as described with reference to process block 420. At least one of the finalized machine learning models is trained to approximate a user process that applies a specific action to an event. The outcome is an action value that predicts the value that the user will assign to the event according to the user process. The action value represents an action that can be taken by the user. For example, the action value may predict a 2-day delivery speed option for a sales order (from an example set of 1, 2, 5, and 10 day delivery speeds). Thus, the action value serves to classify the subsequent event as subject to the specific action—in this case, subject to applying a 2-day delivery speed to the sales order. The processor executes the at least one of the finalized machine learning models on the interaction data structure to determine the action value associated with the user process for the subsequent event. The processor stores the action value as a data structure in storage or memory. The processor associates the action value with the subsequent event in storage or memory.

After the action value is associated with the subsequent event, the processor may store an indication in memory or send a signal that the subsequent event has been classified. Once the processor has thus evaluated the subsequent event data structure with the model to classify the subsequent event as subject to the specific action under the process, processing at process block 720 completes, and processing continues to process block 725.

At process block 725, the processor indicates the subsequent event to be subject to the specific action using the customized user interface. The processor may begin processing at process block 725 in response to parsing the indication or signal that the subsequent event has been classified.

The processor retrieves the subsequent event from memory or storage. The processor generates instructions to cause the subsequent event to be displayed among one or more other subsequent events using the customized user interface. The processor executes the highlighting function to generate instructions to apply highlighting to the subsequent event based on the action value. The highlighting applied to the subsequent event serves to indicate that the subsequent event is subject to the specific user action.

In one embodiment, indicating the subsequent event to be subject to the specific action includes causing the subsequent event to be displayed with highlighting relative to other events using the customized user interface.

Once the processor has thus indicated the subsequent event to be subject to the specific action using the customized user interface, processing at process block 725 completes.

In one embodiment, the processor further automatically applies the specific action to the subsequent event. The processor may perform this in response to receiving a request (for example, from a computing device associated with the user) to automatically apply the specific action. The request may be sent to the processor following a selection by the user of a button or hyperlink. In this example, the processor receives the request and then executes the apply action function. In another example, the processor may execute the apply action function without a request.

Processing then continues to end block 730, where method 700 completes.

FIG. 8A illustrates an example customized user interface 800 customized in accordance with the method presented with reference to FIG. 7. Each of the events presented by the customized user interface 800 has been evaluated with the model of the user's process to determine a classification associated with the process for the subsequent event—a classification that indicates whether or not the subsequent event is subject to a specific action under the process. While in this embodiment the classification itself need not be presented to the user, its effects are shown by the highlighting of events in the customized user interface 800. The customized user interface includes a function that displays the events with a highlight when they are subject to the specific action.

In one embodiment, the classification assigned to the event indicates a prediction that the user will apply a specific action to the event, or, more formally, that the user will classify the event as subject to the specific action under the process. In one embodiment, this classification may be expressed as an outcome variable O. O is an output variable representing a function of observed characteristics presented to the model. If O indicates that the action should be applied to the event, the action may be automatically applied to the event. In one embodiment, the customized user interface 800 will highlight those events that are classified as subject to the specific action, and allow the user to select an input that will automatically apply the action to all highlighted events.

In the context of the purchase order handling example, historical data regarding the specific action of approving the purchase order is used to create the model. For each event in a set of historic events, the observed classifications of outcome variable O as "not approved" or "approved" and a set of observed values of characteristics associated with the purchase order are provided to train the model (as described with respect to method 400). Characteristics of subsequent purchase orders that are to be presented with customized user interface 800 are provided to the model for application of a predicted value of outcome variable O. If the predicted value of O for a purchase order is "approved," the purchase order may be displayed as highlighted for automatic approval.

For example, the historical data may show that the user will almost always approve orders under $3000 from Regular Purchaser, LLC for payment at the end of the month. The user's activity may reflect a business process where Regular Purchaser, LLC is known to the user to be a small business that can afford regular small purchases, but has had previous difficulties paying for large purchases. Accordingly, the model has been trained to classify orders under $3000 from Regular Purchaser, LLC for payment at the end of the month to be subject to automatic approval. This is reflected in the highlighting of orders 805, 810, and 815; while excluding larger order 820.

Further, the Action1 button 825 is added to the customized user interface. The Action1 button 825 is configured to activate an apply action function (described with reference to process block 425) associated with a specific action. Selecting the Action1 button 825 causes the processor to apply the specific action to the highlighted events, such as purchase orders 805, 810, and 815. In this example, the specific action is approval of the purchase orders. The user may then select the Action1 button 825 to apply the automatic approval to the highlighted purchase orders. In one embodiment, the Action1 button 825 may have a title or associated description that indicates that selecting it will apply the selected action to the highlighted purchase orders, and further describe the nature of the selected action. Thus, for example, the Action1 button 825 may be titled "Auto Approve Highlighted POs," and/or have descriptive text stating "The highlighted purchase orders will be automatically approved." In one example descriptive text may be presented adjacent to the Action1 button 825, or in another example, be visible only on hovering a cursor over the Action1 button 825.

As with prioritization of events discussed above, each time the user interacts with an event item from the list, the interaction provides feedback on the accuracy of the model, and the interaction is recorded in system log 190. Thus, for example, the system can observe whether the user agreed or disagreed with the inclusion of an event as subject to the automatic application of an action. In one embodiment, the user is presented with the option to add or remove events from the set of events that should be subject to the automatic application of the action. This may be accomplished by adding or removing highlighting from the event, or by checking or unchecking a box adjacent to the event. The highlighting may be added or removed, in one example, by selecting a hyperlink to add or remove highlighting related to a specific action (such as Action1 or Action 2. The hyperlink may be presented following a selection (for example by right click of a mouse) of the element in the list. The user adjustments to the automatic classification may be used for further training of the model. In this feedback loop, user feedback on the accuracy of the model can be incorporated into the model.

Thus, the addition of the highlighting and the Action1 button to automatically carry out the action on the highlighted events in the customized user interface 800 facilitates the user's process. The facilitation of the process comes both from (i) indicating events subject to the process within the customized user interface 800, and (ii) presenting an option to automatically carry out the user's process without repeated actions by the user.

Example use cases for this generic user process and decision algorithm repetition include numerous applications. In one embodiment, the steps of these example use cases may be performed in accordance with the steps described with reference to FIGS. 4 and 7.

In one example, user processes can be learned from historic user activity when creating or entering bills or purchase orders using the integrated business system 135. User interactions with historical bills or purchase orders may be obtained by parsing the system log 190. Characteristic information may be obtained from the data storage tier 255 of the integrated business system 135, generally from a data store 275 (or data objects 370 or components 375) associated with a module or submodule of the integrated business system 135 that acts on that data. For example, Characteristic information such as various vendor characteristics, as well as item name and other item characteristics associated with the bills or purchase orders, may be obtained from a data store 275 associated with (i) the partner and vendor management module 170, or (ii) the time and billing or order processing sub-modules of ERP module 155 in integrated business server 140. The values of these inputs may be stored as dimensions in a characteristic vector $x=(x1, x2, \ldots xn)$, where n is the number of characteristics. The user's interactions may reflect certain decisions regarding historical bills or purchase orders, such as values for fields that are internal to the user's company and wouldn't typically be on a Bill/PO, including expense accounts, department, class, or location. These decisions may be expressed as output variables representing a function of the characteristic information. The output variables and the characteristic vector may be used to train a model to evaluate newly observed bills or purchase orders, and predict the values of the internal fields for each newly observed bill or purchase order. A customized user interface indicating the predicted decisions, and facilitating the user's implementation of the decisions may be substituted for the standard user interface when presenting the newly observed bills or purchase orders.

In another example, user processes can be learned from historic user activity when creating or entering sales orders using the integrated business system 135. User interactions with historical sales orders may be obtained by parsing the system log 190. Characteristic information such as customer characteristics, sales representative characteristics, and item characteristics associated with the sales orders may be obtained from the data storage tier 255 of the integrated business system 135, for example, from a data store 275 associated with (i) the order processing sub-module of ERP module 155, or (ii) the sales force automation sub-module of CRM module 160 for integrated business server 140. As above, the values of these inputs may be stored as dimensions in a characteristic vector. The user's interactions may reflect certain decisions regarding historical sales orders, such as values for certain fields. For example, for repeat orders for existing customers, some fields may be consistent with prior orders, including items, shipping dates, shipping instructions, pricing, discounts, and payment terms. These decisions may be expressed as output variables representing a function of the characteristic information. The output variables and the characteristic vector may be used to train a model to evaluate newly observed sales orders, and predict the values for the certain fields for each newly observed sales order. A customized user interface indicating the predicted decisions, and facilitating the user's implementation of the decisions may be substituted for the standard user interface when presenting the newly observed sales orders.

In another example, user processes can be learned from historic user activity when fulfilling sales orders using the integrated business system 135. User interactions with historical sales orders may be obtained by parsing the system log 190. Characteristic information associated with the sales orders such as (i) order characteristics including desired/target date and monetary value of the order, (ii) item characteristics including inventory availability, inventory availability by location, weight, and size, (iii) customer characteristics including customer priority, value of the customer, and location, and (iv) characteristics of prior item fulfillments may be obtained from the data storage tier 255 of the integrated business system 135. As above, the values of these inputs may be stored as dimensions in a characteristic vector. The user's interactions may reflect certain decisions regarding historical sales orders, such as which orders to fulfill next, whether to fulfill orders partially or only fulfill entire orders at a time, the location to fulfill the order from, and the method of delivery for the order. Also, as above, these decisions may be expressed as output variables representing a function of the characteristic information. The output variables and the characteristic vector may be used to train a model to evaluate newly observed sales orders, and predict the fulfillment decisions for each newly observed sales order. A customized user interface indicating the predicted decisions, and facilitating the user's implementation of the decisions may be substituted for the standard user interface when presenting the newly observed sales orders.

In another example, user processes can be learned from historic user activity when creating or entering time sheets using the integrated business system 135. User interactions with historical time entries may be obtained by parsing the system log 190. Characteristic information associated with the time entries such as employee characteristics and characteristics of prior time entries may be obtained from the data storage tier 255 of the integrated business system 135, and the values of these inputs may be stored as dimensions in a characteristic vector. The user's interactions may reflect certain decisions regarding historical time entries, such as values for certain fields including dates of entered time, hours worked, activity, associated customer/project, service item, and whether or not time is billable. These decisions may be expressed as output variables representing a function of the characteristic information. The output variables and the characteristic vector may be used to train a model to evaluate newly observed time entries, and predict the decisions for each newly observed time entry. A customized user interface indicating the predicted decisions, and facilitating the user's implementation of the decisions may be substituted for the standard user interface when presenting the newly observed time entries.

In another example, user processes can be learned from historic user activity when creating or entering employee records using the integrated business system 135. User interactions with historical employee records may be obtained by parsing the system log 190. Characteristic information associated with the employee records such as employee name, job title, job location, and employee records of other employees may be obtained from the data storage tier 255 of the integrated business system 135, and the values of these inputs may be stored as dimensions in a characteristic vector. The user's interactions may reflect certain decisions regarding historical employee records, such as values for certain fields including supervisor, email address, department, certifications required, expense limit, expense approver, purchase limit, purchase approver, and payroll frequency. These decisions may be expressed as output variables representing a function of the characteristic information. The output variables and the characteristic vector may be used to train a model to evaluate newly observed employee records, and predict the decisions for each newly observed employee record. A customized user interface indicating the predicted decisions, and facilitating the user's implementation of the decisions may be substituted for the standard user interface when presenting the newly observed employee records.

In another example, user processes can be learned from historic user activity when paying bills using the integrated business system 135. User interactions with historical bills may be obtained by parsing the system log 190. Characteristic information associated with the bills such as due date, payment terms, vendor name and other vendor characteristics (including priority of the vendor and monetary value of past transactions), cash available, estimated cash available in the future, and prior bill payments and paid bills. may be obtained from the data storage tier 255 of the integrated business system 135, and the values of these inputs may be stored as dimensions in a characteristic vector. The user's interactions may reflect certain decisions regarding historical bills, such as when to pay a bill, and which bill(s) to pay next. These decisions may be expressed as output variables representing a function of the characteristic information. The output variables and the characteristic vector may be used to train a model to evaluate newly observed bills, and predict the decisions for each newly observed bill. A customized user interface indicating the predicted decisions, and facilitating the user's implementation of the decisions may be substituted for the standard user interface when presenting the newly observed bills.

In another example, user processes can be learned from historic user activity when processing payroll and identifying and resolving exceptions using the integrated business system 135. User interactions with historical payroll batches may be obtained by parsing the system log 190. Characteristic information associated with the payroll batches such as (i) employees and employee characteristics, including salary/wages, benefits and other deductions, and tax withholding choices, (ii) timesheets, and (iii) prior payroll batches and payments may be obtained from the data storage tier 255 of the integrated business system 135, and the values of these inputs may be stored as dimensions in a characteristic vector. The user's interactions may reflect certain decisions regarding historical payroll batches, such as (i) when to pay, (ii) which employees to pay, (iii) which payments are outliers or anomalies, and (iv) how to handle the outliers and anomalies. These decisions may be expressed as output variables representing a function of the characteristic information. The output variables and the characteristic vector may be used to train a model to evaluate newly observed payroll batches, and predict the decisions for each newly observed payroll batch. A customized user interface indicating the predicted decisions, and facilitating the user's implementation of the decisions may be substituted for the standard user interface when presenting the newly observed payroll batches.

FIG. 8B illustrates an example customized user interface 850 customized with multiple customizations. Multiple customizations based on multiple machine learning models can be included in the customized user interface 850 presented to the user.

In customized user interface 850, the events are displayed based on a priority, similar to the prioritization described with reference to FIGS. 5 and 6B. In this example, historical data regarding the timing of purchase order handling by the user further shows that the user will generally handle purchase orders with buyer addresses in Asia that are paid with payment processors such as PayPal® after all purchase orders from pre-existing customers, and before handling new customers. The user's activity may reflect a business process where orders from Asia paid with PayPal® (such as the purchase orders in set 865) are considered suspicious or fraudulent, and are summarily rejected before orders from other new customers are considered.

Also, in customized user interface 850, the events are displayed with (i) highlights that indicate whether the event is subject to one or more specific actions and (ii) action buttons for carrying out the actions, similar to the classification described with reference to FIGS. 7 and 8A. As discussed with reference to FIG. 8A, a first set of events 860 are highlighted for automatic approval by clicking the Action1 button 825, based on results from a first machine learning model.

In addition, the processor can analyze the data structures to create a second model of a second process applied to the events of the selected type by the user, and further configure the customized user interface 850 to facilitate the second process in addition to facilitating the process. This is performed in the same fashion as for the first model. For example, a model can be trained to classify orders from Asia paid with PayPal® (such as the purchase orders in set 865) as not approved and to be deleted. Such purchase orders will be highlighted in a different way (such as with a different color) in the customized user interface 850, and an additional Action2 button 855 (with features and operation similar to the Action1 button 825) can be added to the customized user interface 850 to automatically apply the non-approval and deletion action. Using the standard user interface, the user will be required to view the order to find the customer's address, and the user would need to go through several steps to delete the purchase order. Further, the various processes are already ordered in the way that the user would handle them. Thus, multiple user processes may be facilitated within the single customized user interface.

Example Use Case—Purchase Order Fulfillment

Consider another example use case for the systems and methods disclosed herein. A vendor is a tenant business of the integrated business system 135. The vendor receives a purchase order in the integrated business system 135, using the order processing module of ERP module 155. The purchase order is for from a specific buyer, and is for a specific item.

In this example, the vendor must determine shipping location and delivery speed for fulfilling the purchase order. Regarding shipping location, the vendor has similar items located in (i) its main warehouse and (ii) several big distribution centers around US. The vendor needs to select which of the above locations the purchased item should be shipped from. Regarding delivery speed, the vendor also has delivery speed options for shipping the item. The vendor needs to select how quickly the item should be delivered. In this example, the vendor has the options of shipping the item (1) Next business day, (2) second business day, (3) in 5 business days, and (4) in next 2 weeks. Generally, the faster the delivery, the more the shipping will cost the vendor.

A user of the integrated business system 135 using a standard user interface will need to individually select a shipping location and a delivery speed in order to deliver each specific order. Very often the user selects different combinations of shipping location and delivery speed for different buyers of different items.

But, by applying the systems and methods of the present application, the combination of shipping location and delivery speed can be predicted based on stored characteristics and automated recommendations based on the prediction can be presented to the user in a customized user interface, thereby facilitating the user's process. The shipping location and delivery speed can be considered output variables of a function of characteristics associated with the purchase order. These characteristics may include, for example, characteristics associated with the buyer of the purchase order, and characteristics associated with the item ordered in the purchase order. These characteristics are captured by the integrated business system 135.

Regarding the buyer characteristics, for example, the integrated business system 135 has records of such characteristics as customer value and customer purchase frequency. Customer value is a metric of how much money this buyer spent on buying different items from the vendor. Customer purchase frequency is a metric of how frequently this buyer is buying items from this vendor (for example, once per year, once per month, once per week, etc.). The customer value and customer purchase frequency for a buyer may each be expressly recorded in a data structure of the integrated business system 135, for example in data objects 370 of a data store 275 associated with the reporting and analysis sub-module of ERP module 155. Alternatively, the customer value and customer purchase frequency for a buyer may each be derived from information recorded in data structures of the integrated business system 135, for example from data objects 370 regarding the buyer in a data store 275 associated with the finance & accounting or order processing sub-modules of ERP module 155.

Regarding the item characteristics, the integrated business system 135 has records of such characteristics as: (1) item price, (2) item total dimensions (perhaps expressed as a tuple of width, length, and height), (3) item weight, (4) whether the item is perishable (such as food) or not, and (5) whether the item is fragile or not. Each of these characteristics may be recorded in a data structure of the integrated business system 135, for example in data objects 370 of a data store 275 associated with the product information management module.

In this example, the delivery speed variable is denoted S. Delivery speed S is a numerical variable (measured in time/days) having the following possible values $\{1, 2, 5, 10\}$.

In this example, the shipping location variable is denoted L. Shipping location L is a categorical variable having values $\{0,1\}$. L=0 corresponds to shipping from main warehouse of the vendor, and L=1 corresponds to shipping from a local distribution center of the vendor closest to a customer shipping address of a buyer. Once the vendor receives a purchase order from the customer in the integrated business system 135, the customer shipping address may be parsed from the purchase order and stored in a data structure of the integrated business system 135. For example, a data store 275 associated with the order processing sub-module of ERP module 155 may include a "purchase order" data object 370 associated with the received purchase order. The "purchase order" data object 370 may include a "customer shipping address" component 375 that stores the customer shipping address. The customer shipping address is then available for retrieval by the integrated business system 135. The addresses of the vendor's main warehouse and local distribution centers may similarly be stored in a data structure. For example, a data store 275 associated with the supply chain management module 175 may include a "warehouse" data object 370 associated with each of the main warehouse and local distribution centers. The "warehouse" data object 370 may include a "warehouse address" component 375 that stores the address of the main warehouse or local distribution center. The address of the main warehouse or local distribution center for retrieval by the integrated business system 135. Because both the customer shipping address and the addresses of the main warehouse and local distribution centers are both available to the integrated business system 135, the integrated business system 135 can calculate the closest (in terms of distance) distribution center to a customer.

In this example, the characteristics associated with the purchase order (including the Buyer characteristics and the Item characteristics) may be represented as a 7-dimension vector $x=(x1, \ldots, x7)$, where x1=customer value, x2=customer purchase frequency, x3=item price, x4=item total dimensions, x5=item weight, x6=whether the item is perishable or not (1 or 0), x7=whether item is fragile or not (1 or 0).

Automated process discovery and facilitation server 195 parses system log 190 to identify the user's interactions with historical purchase orders corresponding to the specific pair of buyer and vendor, in accordance with the steps described with reference to process block 410 of FIG. 4. For each purchase order of this selected type (purchase orders purchase orders corresponding to the specific pair of buyer and vendor), the values selected by the user (the observed values) for the shipping location variable L and the shipping speed variable S are identified from the user interactions with those purchase orders.

Automated process discovery and facilitation server 195 also retrieves the values of the characteristics associated with each purchase order of this selected type from the appropriate data storage locations. The data storage locations may also be derived from entries of the system log 190, or from other data structures.

If there are enough historical purchase orders corresponding to the specific pair of vendor and buyer, and for which the user has selected the shipping location variable L and the shipping speed variable S, then the variables L and S and the characteristics will be used to train a machine learning model. There must be enough historical purchase orders in the set to effectively train the machine learning model. In this example, this threshold is satisfied when there are more than 30 purchase orders.

If there are too few historical purchase orders corresponding to the specific pair of vendor and buyer, and for which the user has selected the variables L and S, additional historical purchase orders may be included. Automated process discovery and facilitation server 195 identifies all historical purchase orders corresponding to the specific pair of buyer and vendor, and parses system log 190 to identify the values selected for the shipping location variable L and the shipping speed variable S by any user associated with the vendor. The values of the characteristics associated with these purchase orders are also retrieved. If the inclusion of these additional historical purchase orders yields enough historical purchase orders to satisfy the threshold (greater than 30 purchase orders) for training the machine learning model, the variables L and S and the characteristics for each of the historical purchase orders will be used to train the machine learning model.

If there are still too few historical purchase orders to satisfy the threshold, then all historical purchase orders of all buyers from the specific vendor may also be included. The values selected for the shipping location variable L and the shipping speed variable S may be by any user associated with the vendor. If the inclusion of these additional historical purchase orders yields enough historical purchase orders to satisfy the threshold (greater than 30 purchase orders) for training the machine learning model, the variables L and S and the characteristics for each of the historical purchase orders will be used to train the machine learning model.

The values of the shipping location variable L, the shipping speed variable S, and the characteristics vector x for each historical purchase order are placed in a data structure by automated process discovery and facilitation server 195. This causes the data to be structured in a uniform way suitable for training a machine learning model. This data structure may be, for example, an array of the form (S, L, x). The data structure for each historical purchase order is stored in memory. In one embodiment, the values of the characteristics in vectors x could be standardized or normalized. In one embodiment, the data structure for each event is created in accordance with the steps described with reference to process block 415 of FIG. 4.

A machine learning model can be fitted to the observed historical purchase orders by the automated process discovery and facilitation server 195. Once a data structure for a historical purchase order is stored in memory, it can be provided to some machine learning model to train the model. For example, a decision tree regression model could be used for predicting numeric delivery speed variable S. Also, for example, a decision tree classification model for predicting categorical shipping location variable L. Those models may be fitted to each of the vectors x=(x1, . . . , x7) provided in the data structures of historical purchase orders. In one embodiment, the models may be fitted to the data structures in accordance with the steps described with reference to process block 420 of FIG. 4.

A customized user interface that uses predicted values of the shipping location variable L and the shipping speed variable S based on a characteristics vector x of a subsequent purchase order is created by the automated process discovery and facilitation server 195. In this example, the customized user interface displays indications based on the predicted values of L and S, such as highlighting of the purchase order, that indicates that the purchase order should be assigned a specific combination of shipping location and shipping speed by the user. The customized user interface also includes a button or other interface element that allows the user to apply the specific combination to all the indicated purchase orders. In one embodiment, this user interface is generated in accordance with the steps described with reference to process block 425 of FIG. 4.

After each model is trained, the decision tree regression model would be used to predict the value of delivery speed variable S and the decision tree classification model would be used to predict the value of shipping location variable L for newly observed purchase order represented in form of vector x=(x1, . . . , x7). This may be performed, for example, by the automated process discovery and facilitation server 195. After the prediction is generated, then it could be rounded to closest of available values of variables S and L. For example, if the decision tree regression model generates a prediction of S=2.4, then it would be rounded to available value of S=2. When the newly observed purchase order is to be presented to the user, the customized user interface is substituted for the standard user interface. The customized user interface presents the newly observed purchase order with the indication of the recommended combination of values of S and L. In one embodiment, the customized user interface is substituted in accordance with the steps described with reference to process block 430 of FIG. 4.

Software Module Embodiments

In general, software instructions are designed to be executed by a suitably programmed processor. These software instructions may include, for example, computer-executable code and source code that may be compiled into computer-executable code. These software instructions may also include instructions written in an interpreted programming language, such as a scripting language.

In a complex system, such instructions are typically arranged into program modules with each such module performing a specific task, process, function, or operation. The entire set of modules may be controlled or coordinated in their operation by an operating system (OS) or other form of organizational platform.

In one embodiment, one or more of the components described herein are configured as modules stored in a non-transitory computer readable medium. The modules are configured with stored software instructions that when executed by at least a processor accessing memory or storage cause the computing device to perform the corresponding function(s) as described herein.

Figure 9:
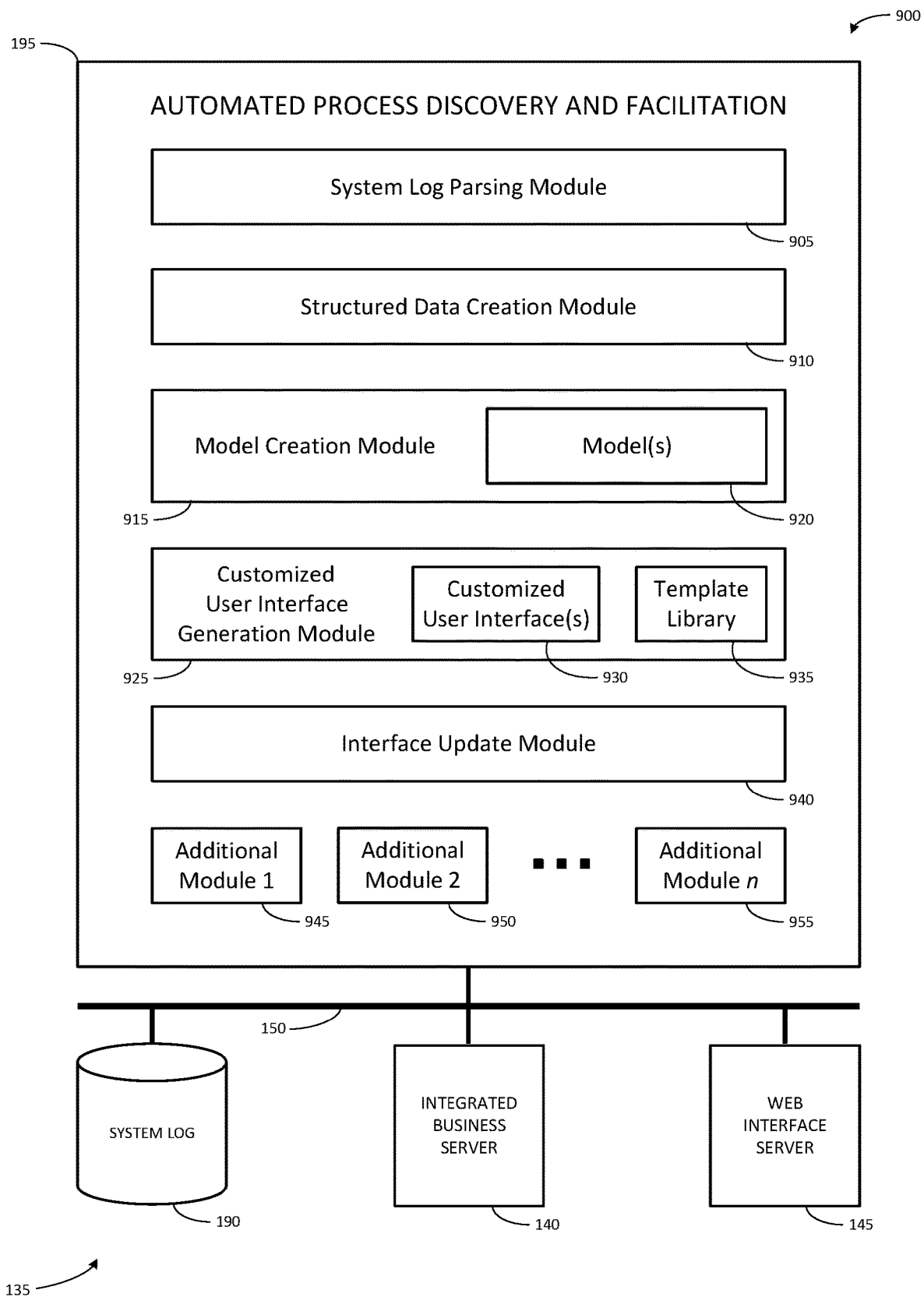
FIG. 9 illustrates one embodiment of an automated process discovery and facilitation server.

FIG. 9 illustrates a more detailed view 900 of one embodiment of automated process discovery and facilitation server 195. Automated process discovery and facilitation server 195 may include a system log parsing module 905. In one embodiment, the system log parsing module 905 includes stored software instructions that when executed by a processor cause the automated process discovery and facilitation server 195 to perform the functions described with reference to process block 410 of FIG. 4.

Automated process discovery and facilitation server 195 may include a structured data creation module 910. In one embodiment, the structured data creation module 910 includes stored software instructions that when executed by a processor cause the automated process discovery and facilitation server 195 to perform the functions described with reference to process block 415 of FIG. 4.

Automated process discovery and facilitation server 195 may include a model creation module 915. The model creation module 915 may create, train, validate, modify, update, delete, replace, or otherwise manage one or more machine learning models 920. In one embodiment, the model creation module 915 includes stored software instructions that when executed by a processor cause the automated process discovery and facilitation server 195 to perform the functions described with reference to process block 420 of FIG. 4.

Automated process discovery and facilitation server 195 may include a customized user interface generation module 925. The customized user interface generation module 925 may generate, create, modify, update, delete, replace or otherwise manage one or more customized user interfaces 930. In one embodiment, the customized user interface generation module 925 may generate the customized user interfaces 930 based at least in part on user interface templates stored in one or more data structures of a template library 930. In one embodiment, the customized user interface generation module 925 includes stored software instructions that when executed by a processor cause the automated process discovery and facilitation server 195 to perform the functions described with reference to process block 425 of FIG. 4.

Automated process discovery and facilitation server 195 may include an interface update module 940. In one embodiment, the interface update module 940 includes stored software instructions that when executed by a processor cause the automated process discovery and facilitation server 195 to perform the functions described with reference to process block 430 of FIG. 4.

Automated process discovery and facilitation server 195 may include one or more additional modules 945, 950, 955. In one embodiment, one or more of the additional modules 945, 950, 955 include stored software instructions that when executed by a processor cause the automated process discovery and facilitation server 195 to perform other functions described herein. For example, one or more of the functions described with reference to FIGS. 5 and 7.

Cloud or Enterprise Embodiments

In one embodiment, the integrated business system 135 is a computing/data processing system including an application or collection of distributed applications for enterprise organizations. The applications and integrated business system 135 may be configured to operate with or be implemented as a cloud-based networking system, a software as a service (SaaS) architecture, or other type of networked computing solution. In one embodiment the automated process discovery and facilitation server 195 is implemented as a centralized server-side application that provides at least the functions disclosed herein and that is accessed by many users via computing devices/terminals communicating with the integrated business system 135 (functioning as the server) over a computer network.

Special Purpose Computing Device Embodiment

Figure 10:
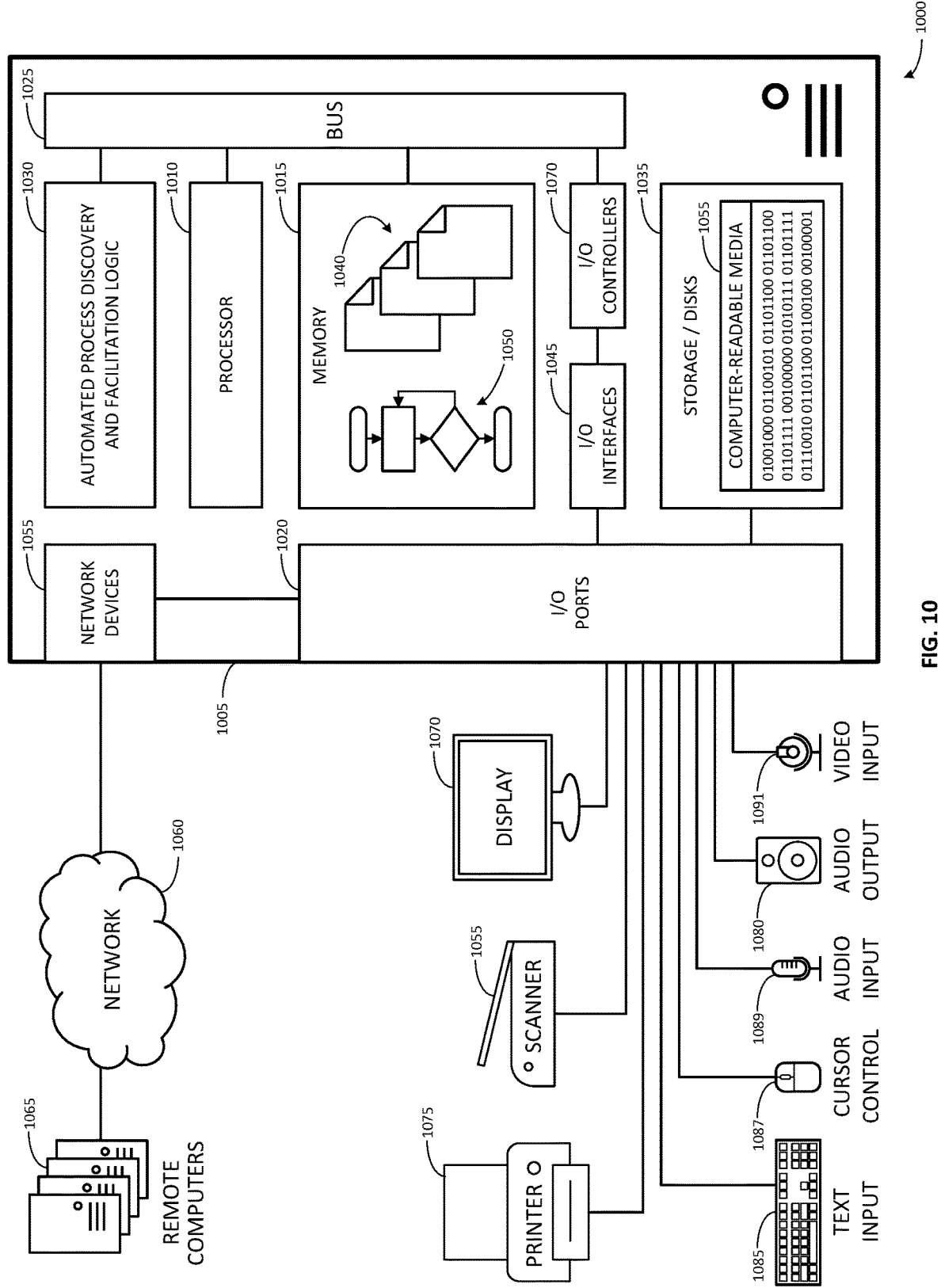
FIG. 10 illustrates an embodiment of a special purpose computing system configured with the example systems and/or methods disclosed.

FIG. 10 illustrates an example computing device that is configured and/or programmed with one or more of the example systems and methods described herein, and/or equivalents. The example computing device may be a computer 1005 that includes a processor 1010, a memory 1015, and input/output ports 1020 operably connected by a bus 1025. In one example, the computer 1005 may include automated process discovery and facilitation logic 1030 configured to enable automated process discovery and facilitation such as the logic and systems shown in FIGS. 4-9. In different examples, the logic 1030 may be implemented in hardware, a non-transitory computer-readable medium with stored instructions, firmware, and/or combinations thereof. While the logic 1030 is illustrated as a hardware component attached to the bus 1025, it is to be appreciated that in other embodiments, the logic 1030 could be implemented in the processor 1010, stored in memory 1015, or stored in disk 1035.

In one embodiment, logic 1030 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to automate process discovery and facilitation. The means may also be implemented as stored computer executable instructions that are presented to computer 1005 as data 1040 that are temporarily stored in memory 1015 and then executed by processor 1010.

Logic 1030 may also provide means (e.g., hardware, non-transitory computer-readable medium that stores executable instructions, firmware) for performing automated process discovery and facilitation.

Generally describing an example configuration of the computer 1005, the processor 1010 may be a variety of various processors including dual microprocessor and other multi-processor architectures. A memory 1015 may include volatile memory and/or non-volatile memory. Non-volatile memory may include, for example, ROM, PROM, EPROM, EEPROM, and so on. Volatile memory may include, for example, RAM, SRAM, DRAM, and so on.

A storage disk 1035 may be operably connected to the computer 1005 via, for example, an input/output (I/O) interface (e.g., card, device) 1045 and an input/output port 1020. The disk 1035 may be, for example, a magnetic disk drive, a solid-state disk drive, a floppy disk drive, a tape drive, a Zip drive, a flash memory card, a memory stick, and so on. Furthermore, the disk 1035 may be a CD-ROM drive, a CD-R drive, a CD-RW drive, a DVD ROM, and so on. The memory 1015 can store a process 1050 and/or a data 1040, for example. The disk 1035 and/or the memory 1015 can store an operating system that controls and allocates resources of the computer 1005.

The computer 1005 may interact with input/output (I/O) devices via the I/O interfaces 1045 and the input/output ports 1020. Input/output devices may be, for example, a keyboard, a microphone, a pointing and selection device, cameras, video cards, displays, the disk 1035, the network devices 1055, and so on. The input/output ports 1020 may include, for example, serial ports, parallel ports, and USB ports.

The computer 1005 can operate in a network environment and thus may be connected to the network devices 1055 via the I/O interfaces 1045, and/or the I/O ports 1020. Through the network devices 1055, the computer 1005 may interact with a network 1060. Through the network 1060, the computer 1005 may be logically connected to remote computers 1065. Networks with which the computer 1005 may interact include, but are not limited to, a LAN, a WAN, and other networks.

The computer 1005 can control one or more output devices, or be controlled by one or more input devices, through I/O ports 1020. The output devices include one or more displays 1070, printers 1075 (such as inkjet, laser, or 3D printers), and audio output devices 1080 (such as speakers or headphones). The input devices include one or more text input devices 1085 (such as keyboards), cursor controllers 1087 (such as mice, touchpads, or touch screens), audio input devices 1089 (such as microphones), and video output devices 1091 (such as video and still cameras).

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

Further, where a series of blocks in a figure expresses a loop, an embodiment in a post-test or "do . . . while" loop could, in other embodiments, be implemented as a pre-test or "while" loop, and vice versa.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
USB: universal serial bus.
WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that when executed by at least a processor of a computer accessing memory of the computer cause the computer to:
   parse a system log of an integrated business system to identify interactions of a user with each event of a selected type of event;
   for each event, create a data structure that describes the interactions with the event based at least in part on (i) the identified interactions and (ii) one or more characteristics of the event;
   analyze the data structures to train a machine learning model to apply a process applied to events of the selected type by the user;
   generate a customized user interface that is configured to present the user with an option to automatically carry out the process for a set of one or more subsequent events of the selected type based on application of the model; and
   substitute the customized user interface for a standard user interface when transmitting instructions to display one or more subsequent events.

2. The non-transitory computer-readable medium of claim 1, wherein the instructions further cause the computer to, for each subsequent event:
   identify one or more characteristics of the subsequent event;
   evaluate the characteristics of the subsequent event with the model to determine a value of a predicted outcome of the subsequent event; and
   assign the value of the predicted outcome to be an action taken on the subsequent event.

3. The non-transitory computer-readable medium of claim 1, wherein the instructions further cause the computer to:
   identify more than one subsequent events of the selected type that have a first common predicted outcome based on application of the model;
   apply first highlighting relative to other events to the subsequent events having the first common predicted outcome; and
   in response to selection of a first graphical user interface element, assign the first common predicted outcome to be the user's action on the subsequent events having the first common predicted outcome.

4. The non-transitory computer-readable medium of claim 3, wherein the instructions further cause the computer to:
   identify more than one subsequent events of the selected type that have a second common predicted outcome;
   apply second highlighting relative to other events that is distinct from the first highlighting to the subsequent events having the second common predicted outcome; and
   in response to selection of a second graphical user interface element, assign the second common predicted outcome to be the user's action on the subsequent events having the second common predicted outcome.

5. The non-transitory computer-readable medium of claim 1, wherein the instructions further cause the computer to:
   display a common predicted outcome for one or more of the subsequent events;
   indicate that the system has detected that the user handles events in a common way;
   request that that the user enter a description of the detected way of handling events; and
   use the description as text of a graphical user interface element for applying the common predicted outcome to be the user's action on subsequent events having the common predicted outcome.

6. The non-transitory computer-readable medium of claim 1, wherein the machine learning model is at least one of a decision tree regression model and a decision tree classification model.

7. The non-transitory computer-readable medium of claim 1, wherein the instructions further cause the computer to:
   analyze the data structures to create a second machine learning model of a second process applied to the events of the selected type by the user, and
   configure the customized user interface to facilitate the second process in addition to facilitating the process.

8. The non-transitory computer-readable medium of claim 7, wherein the machine learning model is a decision tree classification model, and wherein the second machine learning model is a decision tree regression model.

9. The non-transitory computer-readable medium of claim 1, wherein the instructions further cause the computer to:
   determine from the system log that a user has interacted with at least a threshold number of events of the selected type; and present the user with an option to detect the user's processes regarding the selected type of event in response to determining that the threshold number is satisfied;

wherein the analysis of the data structures is performed in response to an affirmative response to the presented option.

10. The non-transitory computer-readable medium of claim 1, wherein the model is associated with only one user of the integrated business system and wherein the customized user interface is provided only to the one user exclusively of other users of the integrated business system.

11. A computer-implemented method, the method comprising:

parsing a system log of an integrated business system to identify interactions of a user with each event of a selected type of event;

for each event, creating a data structure that describes the interactions with the event based at least in part on (i) the identified interactions and (ii) one or more characteristics of the event;

analyzing the data structures to train a machine learning model to apply a process applied to events of the selected type by the user;

generating a customized user interface that is configured to present the user with an option to automatically carry out the process for a set of one or more subsequent events of the selected type based on application of the model; and substituting the customized user interface for a standard user interface when transmitting instructions to display one or more subsequent events.

12. The method of claim 11, further comprising, for each subsequent event:

identifying one or more characteristics of the subsequent event;

evaluating the characteristics of the subsequent event with the model to determine a value of a predicted outcome of the subsequent event; and assigning the value of the predicted outcome to be an action taken on the subsequent event.

13. The method of claim 11, further comprising:

identifying more than one subsequent events of the selected type that have a first common predicted outcome based on application of the model;

applying first highlighting relative to other events to the subsequent events having the first common predicted outcome; and in response to selection of a first graphical user interface element, assigning the first common predicted outcome to be the user's action on the subsequent events having the first common predicted outcome.

14. The method of claim 11, further comprising:

displaying a common predicted outcome for one or more of the subsequent events;

indicating that the system has detected that the user handles events in a common way;

requesting that that the user enter a description of the detected way of handling events; and using the description as text of a graphical user interface element for applying the common predicted outcome to be the user's action on subsequent events having the common predicted outcome.

15. The method of claim 11, further comprising determining from the system log that a user has interacted with at least a threshold number of events of the selected type; and presenting the user with an option to detect the user's processes regarding the selected type of event in response to determining that the threshold number is satisfied;

wherein the analysis of the data structures is performed in response to an affirmative response to the presented option.

16. A computing system for automated process discovery and facilitation, comprising:

a processor;

a memory operably connected to the processor;

a non-transitory computer-readable medium operably connected to the processor and memory and storing computer-executable instructions that when executed by the processor accessing memory of the computer cause the computer to:

parse a system log of an integrated business system to identify interactions of a user with each event of a selected type of event;

for each event, create a data structure that describes the interactions with the event based at least in part on (i) the identified interactions and (ii) one or more characteristics of the event;

analyze the data structures to train a machine learning model to apply a process applied to events of the selected type by the user;

generate a customized user interface that is configured to present the user with an option to automatically carry out the process for a set of one or more subsequent events of the selected type based on application of the model; and substitute the customized user interface for a standard user interface when transmitting instructions to display one or more subsequent events.

17. The computing system of claim 16, wherein the instructions further cause the computing system to, for each subsequent event:

identifying one or more characteristics of the subsequent event;

evaluating the characteristics of the subsequent event with the model to determine a value of a predicted outcome of the subsequent event; and assigning the value of the predicted outcome to be an action taken on the subsequent event.

18. The computing system of claim 16, wherein the instructions further cause the computing system to:

identify more than one subsequent events of the selected type that have a first common predicted outcome based on application of the model;

apply first highlighting relative to other events to the subsequent events having the first common predicted outcome; and in response to selection of a first graphical user interface element, assign the first common predicted outcome to be the user's action on the subsequent events having the first common predicted outcome.

19. The computing system of claim 16, wherein the instructions further cause the computing system to:

display a common predicted outcome for one or more of the subsequent events;

indicate that the system has detected that the user handles events in a common way;

request that that the user enter a description of the detected way of handling events; and use the description as text of a graphical user interface element for applying the common predicted outcome to be the user's action on subsequent events having the common predicted outcome.

20. The computing system of claim 16, wherein the instructions further cause the computing system to:
determine from the system log that a user has interacted with at least a threshold number of events of the selected type; and
present the user with an option to detect the user's processes regarding the selected type of event in response to determining that the threshold number is satisfied;
wherein the analysis of the data structures is performed in response to an affirmative response to the presented option.

* * * * *

UNITED STATES PATENT AND TRADEMARK OFFICE
CERTIFICATE OF CORRECTION

PATENT NO. : 11,294,546 B2
APPLICATION NO. : 17/148995
DATED : April 5, 2022
INVENTOR(S) : Ignatyev et al.

It is certified that error appears in the above-identified patent and that said Letters Patent is hereby corrected as shown below:

In the Specification

In Column 7, Line 1, delete "to the to the" and insert -- to the --, therefor.

In Column 8, Line 29, delete "that that".

In Column 13, Line 9, delete "0" and insert -- O --, therefor.

In Column 15, Line 39, delete "to to" and insert -- to --, therefor.

In Column 18, Line 46, delete "facilitation," and insert -- facilitation. --, therefor.

In the Claims

In Column 40, Line 42, in Claim 5, delete "that that" and insert -- that --, therefor.

In Column 41, Line 58, in Claim 14, delete "that that" and insert -- that --, therefor.

In Column 42, Line 64, in Claim 19, delete "that that" and insert -- that --, therefor.

Signed and Sealed this
Sixteenth Day of August, 2022

Katherine Kelly Vidal
*Director of the United States Patent and Trademark Office*